United States Patent
Zegrar et al.

(10) Patent No.: US 12,362,967 B2
(45) Date of Patent: Jul. 15, 2025

(54) CHANNEL ESTIMATION FOR CONFIGURABLE SURFACES

(71) Applicant: Vestel Elektronik Sanayi ve Ticaret A. S., Manisa (TR)

(72) Inventors: Salah Eddine Zegrar, Istanbul (TR); Liza Afeef Omar Shehab El Din, Istanbul (TR); Hüseyin Arslan, Istanbul (TR)

(73) Assignee: Vestel Elektronik Sanayi ve Ticaret A. S., Manisa (TR)

( * ) Notice: Subject to any disclaimer, the term of this patent is extended or adjusted under 35 U.S.C. 154(b) by 381 days.

(21) Appl. No.: 18/043,349

(22) PCT Filed: Sep. 1, 2021

(86) PCT No.: PCT/EP2021/074113
§ 371 (c)(1),
(2) Date: Feb. 28, 2023

(87) PCT Pub. No.: WO2022/049112
PCT Pub. Date: Mar. 10, 2022

(65) Prior Publication Data
US 2023/0421412 A1    Dec. 28, 2023

(30) Foreign Application Priority Data
Sep. 1, 2020    (EP) .................... 20193900

(51) Int. Cl.
*H04L 25/02*    (2006.01)
*H04B 7/08*    (2006.01)

(52) U.S. Cl.
CPC ......... *H04L 25/0204* (2013.01); *H04B 7/086* (2013.01); *H04B 7/0888* (2013.01);
(Continued)

(58) Field of Classification Search
CPC ... H04B 7/086; H04B 7/0888; H04L 25/0204; H04L 25/0224; H04L 25/0242; H04L 25/025
See application file for complete search history.

(56) References Cited

U.S. PATENT DOCUMENTS

| | | | |
|---|---|---|---|
| 9,948,377 B1 | 4/2018 | Kim et al. | |
| 10,594,517 B1 | 3/2020 | Lo et al. | |
| 2016/0018509 A1 | 1/2016 | McCorkle | |
| 2023/0176174 A1* | 6/2023 | Penna | G01S 5/02521 342/451 |

FOREIGN PATENT DOCUMENTS

| | | |
|---|---|---|
| CN | 101719883 A | 6/2010 |
| CN | 107040296 A | 8/2017 |

(Continued)

OTHER PUBLICATIONS

Fang et al., "Super-Resolution Compressed Sensing for Line Spectral Estimation: An Iterative Reweighted Approach," IEEE Transactions on Signal Processing, Sep. 2016, pp. 4649-4662, vol. 64, No. 18.

(Continued)

*Primary Examiner* — Brian P Cox
(74) *Attorney, Agent, or Firm* — The Webb Law Firm

(57) ABSTRACT

The present disclosure relates to channel estimation, at a receiving device of a communication system employing a (re)configurable surface. The channel estimation includes beamforming search to obtain trained reflection coefficients of the configurable surface and an angle of arrival, AoA, of the signals at the receiving device. Then, based on the configurable surface and the obtained AoA at the receiving device, reflection coefficients of the configurable surface are derived for an ideal channel portion between the transmitting device and the configurable surface. According to a relation between the trained reflection coefficients and the estimated reflection coefficients, the estimation of the characteristics of a channel between the transmitting device and (Continued)

the configurable surface is performed. The channel estimation may be employed in user mobility tracking.

15 Claims, 6 Drawing Sheets

(52) U.S. Cl.
CPC ...... *H04L 25/0224* (2013.01); *H04L 25/0242* (2013.01); *H04L 25/025* (2013.01)

(56) References Cited

FOREIGN PATENT DOCUMENTS

| | | |
|---|---|---|
| CN | 107634787 A | 1/2018 |
| CN | 108139473 A | 6/2018 |
| CN | 109861933 A | 6/2019 |
| CN | 110022274 A | 7/2019 |
| CN | 110519189 A | 11/2019 |
| JP | 2023530800 A | 7/2023 |
| KR | 102582131 B1 | 9/2023 |

OTHER PUBLICATIONS

He et al., "Channel Estimation for RIS-Aided mmWave MIMO Channels," ArXiv:2002.06453v1, Feb. 2020, pp. 1-5. Cornell University Library, 201 Olin Library Cornell University Ithaca, NY.

Hu et al., "Super-Resolution Channel Estimation for MmWave Massive MIMO with Hybrid Precoding," IEEE Transactions on Vehicular Technology, Sep. 2018, pp. 8954-8958, vol. 67, No. 9.

Jia et al., "High-Resolution Channel Estimation for Intelligent Reflecting Surface-Assisted MmWave Communications," ArXiv:2006.11730v1, Jun. 2020, pp. 1-6, Cornell University Library, 201 Olin Library Cornell University Ithaca, NY, 14853.

Ning et al., "Channel Estimation and Transmission for Intelligent Reflecting Surface Assisted THz Communications," EEE International Conference on Communication (ICC), Jun. 2020, pp. 1-7.

Tang et al., "Wireless Communications with Reconfigurable Intelligent Surface: Path Loss Modeling and Experimental Measurement," arXiv:1911.05326v1, Nov. 2019, pp. 1-30.

Va et al., "Beam Tracking for Mobile Millimeter Wave Communication Systems," IEEE Global Conference on Signal and Information Processing (Global SIP), 2016, pp. 743-747, Washington D.C., USA.

Wu et al., "Two-Stage 3D Codebook Design and Beam Training for Millimeter-Wave Massive MIMO Systems," IEEE 85th Vehicular Technology Conference (VTC Spring), 2017, pp. 1-7, Sydney, Australia.

Yapici et al., "Low-Complexity Adaptive Beam and Channel Tracking for Mobile mmWave Communications," 52nd Asilomar Conference on Signals, Systems, and Computers, 2018, pp. 572-576, Pacific Grove, CA, USA.

Zhang et al., "Tracking Angles of Departure and Arrival in a Mobile Millimeter Wave Channel," IEEE International Conference on Communications (ICC), 2016, pp. 1-6, Kuala Lumpur, Malaysia.

\* cited by examiner

US 12,362,967 B2

CHANNEL ESTIMATION FOR CONFIGURABLE SURFACES

CROSS-REFERENCE TO RELATED APPLICATIONS

This application is the United States national phase of International Application No. PCT/EP2021/074113 filed Sep. 1, 2021, and claims priority to European Patent Application No. 20193900.6 filed Sep. 1, 2020, the disclosures of each of which are hereby incorporated by reference in their entireties.

BACKGROUND

Field

The present disclosure relates to channel estimation at communication devices, which communicate with other communication devices by reflection on a configurable surface.

Description of Related Art

Millimeter-wave (mmWave) communication has become one of the key technologies of 5G communication systems. Although mmWave may achieve high data rates and high spectrum efficiency due to its wider signal bandwidth, it usually suffers from severe path-loss and blockage of the line of sight between the communicating devices.

Reconfigurable intelligent surface (RIS) has been discussed as a technology to improve the wireless communication performance. The elements of RIS can reflect, refract, absorb, or focus the incoming waves toward any desired direction. This functionality may help to overcome the above-mentioned issues with mmWave propagation condition comprising path attenuation and blockage.

However, channel estimation in RIS-aided communication is still a major concern due to the passive nature of RIS elements, and estimation overhead that arises with multiple-input multiple-output (MIMO) system.

SUMMARY

Methods and techniques are described for estimating channel in communication system comprising receiving and transmitting device, communicating with each other via a configurable surface.

According to an embodiment, a method is provided for estimating, at a receiving device, characteristics of a channel (BS-UE) between a transmitting device and the receiving device, the channel comprising reflection on a configurable surface, the method comprising: performing beamforming search for transmission of signals over the channel (BS-UE), thereby obtaining: trained reflection coefficients of the configurable surface, and an angle of arrival, AoA, of the signals at the receiving device; estimating, based on the trained reflection coefficients of the configurable surface and the obtained AoA at the receiving device, estimated reflection coefficients of the configurable surface for an ideal channel (BS-RIS) between the transmitting device and the configurable surface; and estimating, according to a relation between the trained reflection coefficients and the estimated reflection coefficients, characteristics of a channel (BS-RIS) between the transmitting device and the configurable surface.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF DRAWINGS

An understanding of the nature and advantages of various embodiments may be realized by reference to the following figures.

Like reference numbers and symbols in the various figures indicate like elements, in accordance with certain example implementations.

DESCRIPTION

Figure 1:
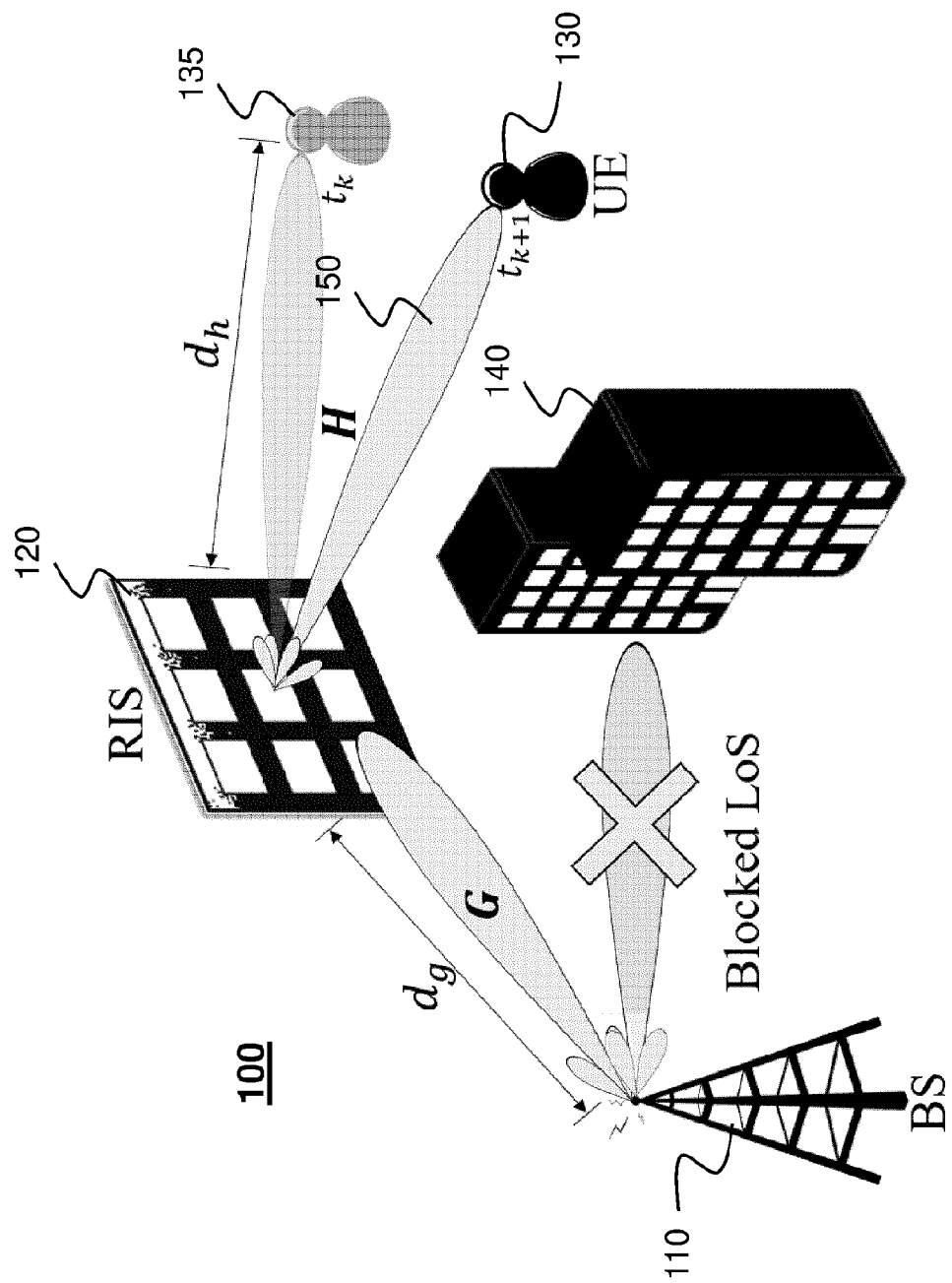
FIG. 1 is a schematic drawing of a system for implementing some embodiments of the disclosure.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Reconfigurable intelligent surfaces (RISs) are also referred to as intelligent reconfigurable surfaces (IRSs). Herein, they are also referred to more simply as reconfigurable surfaces or configurable surfaces. In other words, a configurable surface is a surface comprising a plurality of elements with (re)configurable reflection characteristics.

In general, a RIS is a uniform planar array with a large number of reflective elements. Each reflective element is adapted to passively reflect incident signal and introduce a phase shift to it. In contrast to mirrors, RISs are able to adjust the angle of reflection and electric field strength. RIS technology may support MIMO systems in controlling and improving the wireless channel. The adjustable passive elements can individually steer the incident electro-magnetic (EM) wave toward any specific direction by changing their phases and gains only. Adjusting these elements may allow to align multipath of the reflected signal so that they are added constructively at the receiver. With a proper RIS size and reflection coefficients, the reflected signal is a beam, where the width of this beam is inversely proportional with the size of the RIS. The RIS elements passively reflect the signal, they are easy to implement, have low-cost deployment, and most importantly do not cause noise amplification.

On the other side, RIS also imposes challenges such as channel estimation. Since the RIS is built of a large number of passive elements, RIS-aided communication networks have faced difficulties in estimating the channel reliably. In order to overcome these difficulties, some channel estimation techniques have been proposed, mostly following some simplifying assumptions.

In mmWave, channel estimation becomes more critical and few have considered these high frequency bands. In some works, prior knowledge about the channel between a base station (BS) and the RIS is used. However, considering the channel BS-RIS to be known and time-invariant is not practical since mmWave channel is sensitive to any small changes, which may be caused by any scatterers between the BS and RIS. Moreover, some two-stage cascaded channel estimation protocol have been proposed by exploiting the sparsity of the mmWave MIMO channel between a single BS, RIS, and user equipment (UE). In the receiving stage, beam searching approach is introduced to have high angular domain information, then in a transmitting stage, adaptive grid matching pursuit algorithm is proposed to estimate the high-resolution cascaded channel.

Such channel estimation techniques depend on either cascaded channel concept or some limiting assumptions for estimating the channel BS-RIS-UE. Since RIS reflects the signal and focuses the energy into a specific direction, UE's location should be considered in the estimation process. The UE location may change in time, so that user tracking could be a desirable feature. Moreover, it has been shown that the path loss is a function of reflection coefficients of RIS, which are typically ignored in the channel estimation process when the phases are optimized for channel estimation.

The present disclosure addresses channel estimation, beamforming, and user tracking in mmWave RIS-MIMO systems. By providing the relation of RIS design with MIMO system, a three-stage framework may then be employed which is exemplified in one of the embodiments. In particular, in one embodiment, the channel between the BS and the RIS is estimated using hierarchical beam searching. In addition, in a further embodiment, the channel between the RIS and user is estimated, e.g., using an iterative resolution algorithm. In a further embodiment, a tracking algorithm is employed to track channel parameters between the RIS and the user.

Reconfigurable (or Configurable) Intelligent Surface (RIS) Model

FIG. 1 illustrates an exemplary communication system 100, which may implement some embodiments of the present disclosure. In particular, the communication system 100 comprises a base station (BS) 110, a RIS 120 and a user equipment (UE, also referred to as user or terminal) 135. This communication system is only exemplary. In general, a communication system for implementing the present disclosure may comprise a receiving device (mobile or stationary), a RIS, and a transmitting device (mobile or stationary).

The BS 110 in FIG. 1 is a base station such as an eNB or gNB of a 3GPP system such as long term evolution (LTE) or new radio (NR) or another generation system. In other words, the BS may be an access network node of a cellular wireless system. However, the BS may also be an access point (AP) of a local area network (LAN), such wireless LAN, e.g. according to IEEE 802.11 standards. The embodiments presented herein may be readily employed in systems such as 3GPP NR or IEEE 802.11be or other emerging systems. Another possibility is to employ the present disclosure to any communication between two devices in device to device communication, without presence of or connection to some network infrastructure.

The RIS 120 is a planar array of passive reflective element with configurable phase shift and possibly/optionally a configurable attenuation. FIG. 1 shows merely schematically a RIS of a square form with 3×3 elements, resulting in number of elements $M_{RIS}=9$. However, this is only a schematic representation. In practice, the RIS may have a much larger size. For example, sizes of $M_{RIS}=16$, 64, or 256 may be employed, or any other square sizes. The RIS does not have to be square. It may be rectangular or have any other shape. Several different shapes such as square, rectangular, hexagonal, circular, etc. have been studied.

The UE 135 in FIG. 1 is illustrated as a user device at time $t_k$ in specific location which could be a mobile moving toward different location UE 130 at time $t_{k+1}$. However, the present disclosure is not limited thereto and, in general, the UE 135 may be any communication device, such as machine-type device for Internet of Things (IoT) application a base station, an access point, a repeater, or any other wireless infrastructure entity. In general, the RIS 120 may, at the same time, reflect beams directed to different receiving devices.

The channel between the BS 110 and the RIS 120 is denoted as G. The channel between the RIS 120 and a UE 135 is denoted as H. In particular, G and H refer to channel matrices, which describe the respective channel characteristics. A channel matrix specifies how the channel modifies an input signal. For example, an input signal x transmitted from multiple antennas m (and thus being represented as a vector) is modified by the channel matrix G and added a noise signal n (also a vector), resulting in signal y=G·x+n (a vector of the size corresponding to the number of receiving antennas). In the present example, thus $G \in \mathbb{C}^{M_{RIS} \times M_{BS}}$ and $H \in \mathbb{C}^{M_{UE} \times M_{RIS}}$ denote the channels (represented by the channel matrices) between BS-RIS and RIS-UE, respectively.

Symbols $M_{BS}$ and $M_{UE}$ denote the number of antennas (antenna array elements) at the BS 110 and the UE 135, respectively.

In the communication system 100, not only the RIS 120, but also the BS 110 and the UE 135, may be equipped with an equidistant uniform planar array (UPA) as an antenna structure with half-wavelength distance between the antenna elements. The uplink and downlink transmissions may use a time-division duplex (TDD) protocol that exploits channel reciprocity for the acquisition of channel state information (CSI) at the RIS 120 in both link directions (such as uplink and downlink, or in general both directions between the communicating entities). The BS 110 is typically assumed to have $M_{RF}$ radio frequency (RF) chains where the number of these chains is much smaller than the number antenna array elements and larger than the number, k, of UEs, 135, i.e. $k \leq M_{RF} << M_{BS}$. UE 135 is considered to have one RF chain. The RIS 120 may be placed near to the UE side and far from the BS side to reduce (minimize) the pathloss effect. In order to fully exploit the functionality of the RIS 120, the channel path between the BS 110 and UE 135 is shown in FIG. 1 to be blocked by an obstacle 140. Thus, there is no line of sight (LoS) between the BS 110 and the UE 135. The distance between the BS and the RIS is denoted as $d_g$, whereas the distance between the RIS and a UE is denoted as $d_h$.

The RIS elements may be placed in a uniform rectangular shape. For example, assuming a square shape with dimensions $N_{RIS} \times N_{RIS}$, the $M_{RIS} = N_{RIS}^2$ reflection coefficients of these elements may be represented by a following reflection coefficient matrix:

$$\phi = \begin{bmatrix} \phi_{1,1} & \cdots & \phi_{1,N_{RIS}} \\ \vdots & \ddots & \vdots \\ \phi_{N_{RIS},1} & \cdots & \phi_{N_{RIS},N_{RIS}} \end{bmatrix} \quad \text{(Eq \#1)}$$

wherein $\phi_{n,m} = \gamma_{n,m} e^{j\alpha_{n,m}}$ is reflection coefficient of the (n, m)-th RIS element, where $\alpha_{n,m} \in [0, 2\pi)$ represents the phase shift induced by the (n, m)-th element, and $\gamma_{n,m} \in [0,1]$ stands for the reflection gain. Usually, it is a good approximation to assume that the reflection gain is unity: $\gamma_{n,m} = 1, \forall (n,m)$. The indices n and m address the vertical and horizontal (row and column) coordinates of the corresponding antenna element within the UPA of the RIS 120.

Another convenient representation of reflection coefficients in term of facilitating computations can be given as:

$$\Theta = \text{diag}\{\text{vec}(\phi)\} \quad \text{(Eq \#2)}$$

This corresponds to a diagonal matrix with the diagonal corresponding to vectorized matrix $\phi$. The reflection coefficients $\phi_{n,m}$ of the RIS 120 are configurable and, in some embodiments, may be configured (set) by the BS 110.

Considering the system model shown in FIG. 1, the reflected signals from each element of the RIS 120 may be configured to be aligned in phase to enhance the received signal power. The free space pathloss can be calculated as shown in W. Tang, M. Z. Chen, X. Chen, J. Y. Dai, Y. Han, M. Di Renzo, Y. Zeng, S. Jin, Q. Cheng, and T. J. Cui, "*Wireless communications with reconfigurable intelligent surface: Path loss modeling and experimental measurement,*" arXiv preprint arXiv:1911.05326, 2019 which is incorporated herein by reference.

The channel with a minimum pathloss may be seen as a channel description when assuming that a signal is going to be reflected toward the same location and G is an ideal channel i.e., it has a unitary gain. However, when G is assumed to be a sparse channel where LoS path between BS 110 and RIS 120 is the dominant path, it is observed that the beam is shifted toward a direction different from that of the location of the UE 135. A sparse channel has less number of scatters resulting in a small number of correlated multipath which leads to channel representation with few number of non-zero elements. On the other hand, when channel G is very rich on scattering, the UE 135 will receive a very low power from RIS 120 so that the RIS may react worse than a normal reflector (metallic surface, wall, etc.). Thus, for a successful reflection, G, may be individually estimated and then equalized at the RIS 120 by simply reversing its effect.

After reflecting the beam at the RIS 120, the UE 135 estimates and equalizes H to complete successful communication. In other words, the RIS 120 performs two different operations separately:
1) Accumulation, where it collects all the energy received by each of its elements (resulting in gain being proportional to $M_{RIS}^2$) and then aligning them by cancelling the effects of the channel G.
2) Beamforming/Steering, the RIS 120 acts like a virtual BS (in general, a virtual transmitter), and focuses or steers the incoming electromagnetic waves toward the UE's location.

As mentioned above, most of the known approaches consider the UE 135 to be stationary, and BS 110 to have always LoS with RIS 120. However, these assumptions are not realistic, and tend to limit the use of the RIS 120. They are a consequence of a cascaded channel model that is given by $H_{cascaded} = G \cdot H$. This representation makes channel tracking in time almost impossible, since any change in $H_{cascaded}$ could be due to change in G or H or both. Herein, since G but not H affects the phases of the RIS, G may be estimated separately, and estimating H becomes feasible which may enable tracking the UE 135.

BS-RIS Channel and Channel Matrix G

In order to estimate channel, training (reference) symbols s are transmitted from the BS 110 to the UE 135. In particular, the training symbols s may be transmitted via orthogonal precoding beams for user 135, such that there is no inter-user interference to the other users in the system. Under this assumption, the analysis may be restricted to one representative UE 135 without loss of generality. Under the assumption of flat-fading and perfect timing and frequency synchronization, the sparsity of the channel is exploited by using geometric channel modeling. The model represented by the channel matrix $G \in \mathbb{C}^{M_{RIS} \times M_{BS}}$ may be given as $$G = \sum_{l=1}^{L_g} z_{g,l} a_{M_{RIS}}(\theta_{g,l}^R, \varphi_{g,l}^R) a_{M_{BS}}^H(\theta_{g,l}^B, \varphi_{g,l}^B) = \quad \text{(Eq \#3)}$$

$$A_{M_{RIS}}(\Omega_R) \text{diag}(z_g) A_{M_{BS}}^H(\Omega_B),$$

where $L_g$ is the number of channel paths received at the RIS 120 (i.e., paths between the BS 110 and the RIS 120), $\theta_{g,l}^R$, $\varphi_{g,l}^R$ are respectively the elevation and azimuth angle of arrival (AoA) at the RIS of the l-th BS-RIS-path, $\theta_{g,l}^B$, $\varphi_{g,l}^B$ are respectively the elevation and azimuth angle of departure (AoD) from the base station of the l-th BS-RIS-path, and $z_{g,l}$ is the complex channel coefficient between BS-RIS at an l-th path. Moreover, $\Omega_R = [(\theta_{g,1}^R, \varphi_{g,1}^R), (\theta_{g,2}^R, \varphi_{g,2}^R), \ldots, (\theta_{g,L_g}^R, \varphi_{g,L_g}^R)]^T$, $\Omega_B = [(\theta_{g,1}^B, \varphi_{g,1}^B), (\theta_{g,2}^B, \varphi_{g,2}^B), \ldots, (\theta_{g,L_g}^B, \varphi_{g,L_g}^B)]$, $z_g = [z_{g,1}, z_{g,2}, \ldots z_{g,L_g}]^T$, diag($z_g$) is the diagonal matrix $\in \mathbb{C}^{L_g \times L_g}$ having the individual elements $z_{g,l}$ of the vector $z_g$ on its diagonal, symbol $\alpha_{M_{RIS}}$ denotes the array response vector of the UPA of the RIS 120, and symbol $\alpha_{M_{BS}}$ denotes the array response vector of the UPA of the BS 110. As can be seen in the above notation, superscript B refers to base station 110 (in general to the transmitting device), R refers to the RIS 120, and U will refer to the UE 135 (in general to a receiving device).

In general, an array response vector of an UPA is represented by:

$$a_{M_i}(\theta, \varphi) = \frac{1}{\sqrt{M_i}}(q(\sin(\theta)\cos(\varphi)) \otimes p(\sin(\theta)\sin(\varphi))), \text{ where} \quad (\text{Eq \#4})$$

$$q(u) = \left[1, e^{\frac{j2\pi}{\lambda}du}, \ldots, e^{\frac{j2\pi}{\lambda}(N_x-1)du}\right]^T \text{ and}$$

$$p(v) = \left[1, e^{\frac{j2\pi}{\lambda}dv}, \ldots, e^{\frac{j2\pi}{\lambda}(N_y-1)dv}\right]^T,$$

for $i \in \{RIS, BS\}$. Symbol $\otimes$ represents Kronecker product, $\lambda$ is the wavelength of the signal, $N_x$ and $N_y$ denote respectively the number of elements of the UPA in the vertical and horizontal dimension, du and dv denote respectively the distance between neighboring elements of the UPA in the vertical and horizontal direction. Accordingly, $A_{M_{RIS}}(\Omega_R)$ and $A_{M_{BS}}^H(\Omega_B)$ are matrices given by:

$$A_{M_i}(\Omega_j) = (\alpha_{M_i}(\theta_{g,1}^j, \varphi_{g,1}^j), \alpha_{M_i}(\theta_{g,2}^j, \varphi_{g,2}^j), \ldots,$$
$$\alpha_{M_i}(\theta_{g,L_g}^j, \varphi_{g,L_g}^j)), \text{ for } i \in \{RIS, BS\} \text{ and } j \in \{R, B\}.$$

It is noted that for sparse channels, the number of paths $L_g$ is much lower than number of antenna elements at the RIS. For instance, for about 10 antenna elements, 1 or 2 paths could be considered.

RIS-UE Channel and Channel Matrix H

Similarly, $H \in \mathbb{C}^{M_{UE} \times M_{RIS}}$ can be expressed as:

$$H = \sum_{l=1}^{L_h} z_{h,l} a_{M_{MU}}(\theta_{h,l}^U, \varphi_{h,l}^U) a_{M_{RIS}}^H(\theta_{h,l}^R, \varphi_{h,l}^R) = \quad (\text{Eq \#5})$$

$$A_{M_{UE}}(\Psi_U)\text{diag}(z_h)A_{M_{RIS}}^H(\Psi_R)$$

where $\theta_{h,l}^U, \varphi_{h,l}^U$ are respectively the elevation and azimuth AoA of the l-th RIS-UE-path, $\theta_{h,l}^R, \varphi_{h,l}^R$ are respectively the elevation and azimuth AoD of the l-th RIS-UE-path. Moreover, $\Psi_U = [(\theta_{h,1}^U, \varphi_{h,1}^R), (\theta_{h,2}^R, \varphi_{h,2}^R), \ldots, (\theta_{h,L_h}^U, \varphi_{h,L_h}^U)]^T$, symbol $\alpha_{M_{BU}}$ denotes the array response vector of the UPA of the UE 135, $L_h$ is number of paths between the RIS 120 and the UE 135, $\Psi_R = [(\theta_{h,1}^R, \varphi_{h,1}^R), (\theta_{h,2}^R, \varphi_{h,2}^R), \ldots, (\theta_{h,L_h}^R, \varphi_{h,L_h}^R)]^T$, $z_h = [z_{h,1}, z_{h,2}, \ldots, z_{h,L_h}]^T$, and diag($z_h$) is the diagonal matrix $\in \mathbb{C}^{L_h \times L_h}$ having the individual elements $z_{h,l}$ of the vector $z_h$ on its diagonal.

Accordingly, $A_{M_{UE}}(\Psi_U)$ and $A_{M_{RIS}}^H(\Psi_R)$ are matrices given by $$A_{M_i}(\Psi_j) = (\alpha_{M_i}(\theta_{h,1}^j, \varphi_{h,1}^j), (\theta_{h,2}^j, \varphi_{h,2}^j), \ldots,$$
$$(\theta_{h,L_h}^j, \varphi_{h,L_h}^j)), \text{ for } i \in \{UE, RIS\} \text{ and } j \in \{U, R\}.$$

BS-RIS-UE Channel and Channel Matrix $H_{\text{eff}}$

The overall channel $H_{\text{eff}} \in \mathbb{C}^{M_{UE} \times M_{BS}}$ between the BS-RIS-UE is given by:

$$H_{\text{eff}} = \beta(d_g, d_h, \theta_{des}, \varphi_{des}) H \Theta G, \quad (\text{Eq \#6})$$

where $\beta(d_g, d_h, \theta_{des}, \varphi_{des})$ is a total path loss calculated as in the paper by W. Tang et al mentioned above. That is, the path loss is in general a function of the distance $d_g$ between the base station and the RIS, the distance $d_h$ between the RIS and the UE (see FIG. 1), and the departure angle of signals from the RIS.

Channel Estimation Framework

In order to estimate the channel, the effective channel in (Eq #6) can be rewritten in terms of modified channel matrices $\hat{H}$ and $\hat{G}$ as follows:

$$H_{\text{eff}} = \beta(d_g, d_h, \theta_{des}, \varphi_{des})\hat{H}\Theta\hat{G}, \quad (\text{Eq \#7})$$

where $$\hat{H} = A_{M_{UE}}(\Psi_U)\text{diag}(z)A_{M_{RIS}}^H(\Psi_R), \text{ and}$$

$$\hat{G} = A_{M_{RIS}}(\Omega_R)\text{diag}(e^{j\cdot\arg(z_g)})A_{M_{BS}}^H(\Omega_B).$$

Here, $\text{diag}(e^{j\cdot\arg(z_g)}) = \begin{pmatrix} e^{j\cdot\arg(z_{g,1})} & \cdots & 0 \\ \vdots & \ddots & \vdots \\ 0 & \cdots & e^{j\cdot\arg(z_{g,L_g})} \end{pmatrix}$, where $\arg(z_{g,l})$ denotes the phase of the coefficient $z_{g,l} = |z_{g,l}| e^{j\cdot\arg(z_{g,l})}$. Since G is directly responsible for altering the RIS phases, it may be more meaningful to represent it only in terms of $\angle z_{g,l} = \arg(z_{g,l})$, and include the channel gain $|z_g|$ into H. z is containing the channel coefficients $z_{h,l}$ of the channel H and the channel gain $|z_{g,l}|$ of the channel G.

In general, the modified channel matrix $\hat{G}$ corresponds to a matrix obtained from a channel matrix G of the channel between the transmitting device (110) and the configurable surface (120) by setting an absolute value of each element of the channel matrix G to one, and further comprising a step of determining, based on the modified channel matrix $\hat{G}$, a modified channel matrix $\hat{H}$. In other words, the modified channel matrix $\hat{G}$ only accounts for the phase change caused by the BS-RIS channel. The power change of G becomes part of the modified matrix $\hat{H}$.

Writing the channel in this form may allow for estimating H and G separately. The BS-RIS channel G can then be estimated using hierarchical beam searching algorithm. Furthermore, the RIS-UE channel H can be estimated, e.g. by adopting an iterative reweight algorithm to estimate channel path coefficients only, exploiting the angles resulting from the beam searching algorithm.

Estimation of BS-RIS channel $\hat{G}$

Since mmWave channel is sparse and the new $\hat{G}$ representation of the BS-RIS has a unit amplitude (because the G channel coefficients are transferred to be included in channel H, channel G became $\hat{G}$ with phases only and unit gains), the problem of estimating $\hat{G}$ becomes equivalent to the estimation of ($e^{j\arg(z_g)}$ of each path. In other words, $\hat{G}$ causes a shift in the reflected beam, and hence, estimating this shift leads to estimating $\hat{G}$ itself. This is performed in the following three steps, which will be described below in more detail:

1) Estimating AoA and AoD, $(\theta_{h,l}^U, \varphi_{h,l}^U)$ and $(\theta_{h,l}^R, \varphi_{h,l}^R)$, for the signal reflected by the RIS 120.
2) Obtaining the reflection coefficients of RIS in the absence of $\hat{G}$'s effect by substituting the angles $(\theta_{h,l}^U, \varphi_{h,l}^U)$ and $(\theta_{h,l}^R, \varphi_{h,l}^R)$ in equation (Eq #16) and then get the matrix $\Theta$ from equation (Eq #2).
3) Then, the so obtained reflection coefficients are compared to the last coefficient set by the BS and their phases are subtracted from each other to obtain $\hat{G}$.

Estimating Angle of Arrival (AoA) and Angle of Departure (AoD)

In general, by performing beamforming search (or beamforming training) for transmission of signals over the BS-UE channel, trained reflection coefficients of the configurable surface 120, and an angle of arrival (AoA) of the signals at the receiving device 135 may be obtained.

More specifically, the AoA ($\theta_{h,l}^U$, $\varphi_{h,l}^U$) and the AoD ($\theta_{h,l}^R$, $\varphi_{h,l}^R$) can be determined by an exhaustive beam searching algorithm. In the exhaustive beam searching algorithm, possible angles are tested to find one optimal AoA and AoD. However, such approach may require a large amount of time due to its complexity.

Figure 2:
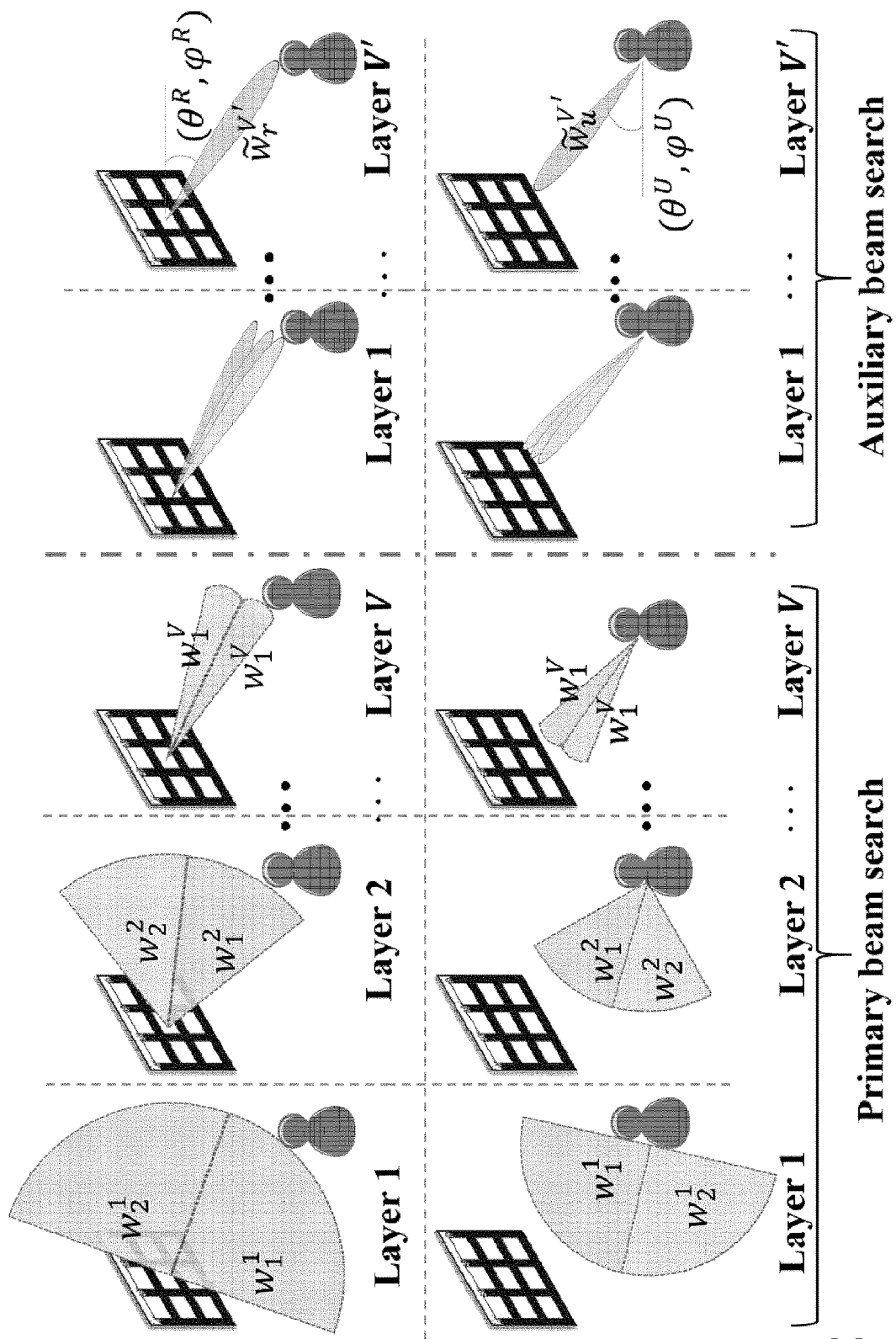
FIG. 2 is a schematic drawing illustrating a hierarchical beam searching algorithm procedures for channel estimation.

For instance, as further explained below and as illustrated in FIG. 2, the beamforming search may be performed essentially just between RIS and UE. More specifically, the AoD ($\theta_{g,l}^B$, $\varphi_{g,l}^B$) at the base station and the AoA ($\theta_{g,l}^R$, $\varphi_{g,l}^R$) at the RIS may be kept fixed during the beamforming search. For instance, the location of the base station and the RIS and, thus, the optimal AoD and AoD of the BS-RIS channel may be already known (e.g. predetermined). The beamforming search may then be performed by adapting the phases of the RIS (i.e., by adapting the reflection coefficients). In other words, in the beamforming search, the AoD ($\theta_{h,l}^R$, $\varphi_{h,l}^R$) at the RIS may be changed, while the AoA ($\theta_{g,l}^R$, $\varphi_{g,l}^R$) at the RIS may be kept fixed. Thereby, an optimal AoD from the RIS to the UE corresponding to an optimal beam direction can be determined, where the term "optimal" refers e.g. to the reception quality and/or strength of the signal at the UE. The trained reflection coefficients thus correspond to said optimal AoD from the RIS found during the beamforming search. However, the present disclosure is not limited thereto. In general, the trained reflection coefficients may be obtained by a beamforming search, in which different AoAs ($\theta_{g,l}^R$, $\varphi_{g,l}^R$) at the RIS and/or different AoD ($\theta_{h,l}^R$, $\varphi_{h,l}^R$) at the RIS are used. For instance, the AoD ($\theta_{g,l}^B$, $\varphi_{g,l}^B$) at the base station and the reflection coefficients at the RIS may be varied in order to find an optimal pair of beam direction at the base station and beam direction of reflected beam at the RIS.

Accordingly, in the following, a two-stage beam training method is employed, comprising a primary and an auxiliary beam search as described in detail in W. Wu, D. Liu, Z. Li, X. Hou, and M. Liu, "Two-stage 3D codebook design and beam training for millimeter-wave massive MIMO systems," in 2017 IEEE 85th Vehicular Technology Conference (VTC Spring), Sydney, NSW, Australia. IEEE, 2017, pp. 1-7, which is incorporated herein by reference. However, it is noted that the present disclosure is not limited to such beam training approach and that, in general any other approach may be used, comprising the above-mentioned exhaustive search or its modifications.

In the following, the hierarchic, two-stage beam training method is briefly summarized. For simplicity, the training procedure is described in azimuth only. Analogically, the procedure in elevation can be deduced. FIG. 2 illustrates the hierarchical beam searching algorithm procedures for channel estimation. The primary codebook generates a basic directional beam. The number of phase shifts of the primary codebook may be quite limited in order to reduce the complexity. The small-size auxiliary codebook provides finer beams that are centered on each primary beam. Here, the term codebook refers to predefined beams set in the absence of channel state information.

In an exemplary implementation, the primary search uses hierarchical search to reduce the search time. A two-way (binary) tree search is used here, at each layer. Let $w_n^l$ denote the codeword of the $n^{th}$ beam vector at the $l^{th}$ layer. Accordingly, the codeword $w_n^l$ is a scalar referring to a beam vector ($w_i^l$, i being RIS side "r" or UE side "u" and l being the layer). Beam vector specifies the antenna factors to form the beam. At each layer l only $2^l$ antennas are activated (in each direction, transmitting direction as shown in the top part of FIG. 2 and receiving direction as shown in bottom part of FIG. 2). In total, there will be $\aleph$ possible beams and V=log$_2$($\aleph$). Each parent codeword $w_n^l$ has two child codewords $w_n^{l+1}$ and $w_{n+1}^{l+1}$. It is aimed to obtain the AoA angles ($\theta_{h,l}^U$, $\varphi_{h,l}^U$) and the AoD angles ($\theta_{h,l}^R$, $\varphi_{h,l}^R$) through multiple steps corresponding to the primary beam search comprising V layers and the auxiliary beam search comprising V' layers. As shown in FIG. 2, layer 1 (i.e., the first layer) operation starts by testing four possible pairs of wide beams in four successive time slots, where the RIS 120 uses $w_r=[w_1^1, w_2^1]$ at the reflecting mode (determining AoD) and the UE 135 uses $w_u=[w_1^1, w_2^1]$ at the receiving mode (determining AoA). In layer 2, more antenna elements are employed to generate four narrower beams, two at the reflecting mode $w_r=[w_1^2, w_2^2]$ and two at the receiving mode $w_u=[w_1^2, w_2^2]$ etc. until the V-th layer which terminates the primary search. For example, the two beams (same applies for the reflecting and the receiving mode) are obtained by screening all possible beam patterns of the current, l-th, layer to select two beams having greatest similarity to the best beam of the preceding, (l−1)-th, layer. The similarity may be measured by any similarity measure (metric), e.g. as shown in W. Wu et al. above, e.g. by comparing the array factors of the beams. However, the present disclosure is not limited to comparing the array factor or to any particular similarity measure.

The resulted signal from the $l^{th}$ layer can be written as:

$$y^l = \beta(d_g, d_h, \theta_{des}, \varphi_{des})(w_u^l)^H \hat{H} w_r^l \hat{s} + (w_u^l)^H n \qquad \text{(Eq \#8)}$$

where $\hat{s} = \hat{G}s$, $s=[s_1, s_2, \ldots, s_Z]^T$ is Z×1 vector of transmitted training symbols (known at the BS and the UE), and n is Z×1 complex Gaussian noise vector with zero-mean and variance $\sigma_0^2$.

At each layer l we search for the pair ($\tilde{w}_r^l$, $\tilde{w}_u^l$) of beam vectors that satisfies the highest received SNR as follows:

$$\max_{w_r^l, w_u^l} \left( \left| (w_u^l)^H \hat{H} w_r^l \hat{s} \right|^2 \right) = \left| (\tilde{w}_u^l)^H \hat{H} \tilde{w}_r^l \hat{s} \right|^2 \qquad \text{(Eq \#9)}$$

After V layers of primary beam search, the optimum (best) pair ($\tilde{w}_r^V$, $\tilde{w}_u^V$) of beam vectors is obtained in the receiving, primary stage.

The primary codebook may be selected in various different ways and the present disclosure is not limited to any particular approach. By way of an example only, the primary codebook matrix in azimuth of K beam patterns, τ—is the number of possible shifts. i.e., the discrete shift is 2 pi/τ, and $N_{RIS}$ elements are given as in the above mentioned paper by W. Wu et al. as follows:

$$w_{n,k}^{az} = \exp\left(-\frac{j2\pi}{\tau}\left\lfloor\frac{nk\tau}{K}\right\rfloor\right), \qquad \text{(Eq \#10)}$$

where n=0, 1 ... $N_{RIS}$−1 and k=0, 1 ... K−1. Parameter K may depend on the design (characteristics) of the antennas. This codebook may be designed such that it has $\aleph$ possible states (i.e. $\aleph$ possible beams), and it fully spans the azimuth range. The designing is achieved by selecting the desired values for N, K, and τ. Similarly, the primary beam codebook matrix in elevation is given by:

$$w_{n,k}^{el} = \exp\left(-\frac{j2\pi}{\tau}\left\lfloor\frac{nk\tau}{2K-2}\right\rfloor\right). \qquad \text{(Eq \#11)}$$

The transmitting stage starts after acquiring the primary codebook, where an auxiliary beam search is performed by rotating the primary beam to create higher-resolution auxiliary beams.

In particular, a predefined number (such as one, two or more) of auxiliary beam patterns are uniformly and symmetrically distributed on the two sides of the known optimal primary beam. These beams define the auxiliary codebook. Finally, a pair of beam vectors ($\tilde{w}_r$, $\tilde{w}_u$) is considered the optimum pair among the pairs based on the auxiliary codebook, when it fulfils Eq #9 above. As illustrated in FIG. 2, for example, 9 beam pairs comprising the optimal primary beam and the two adjacent beams at both sides RIS (transmitting, Tx) and US (receiving, Rx) are evaluated to find the beam pair with the maximum received SNR. This beam may selected and the search may further continue by selecting the beam direction with higher SNR potential and performing the beam scanning to find some pair with maximum SNR. The beam search may be stopped if the SNR begins to decrease. As is clear to those skilled in the art, variations of the auxiliary search are possible. The above described approach is to merely illustrate one possibility. In general, as shown in FIG. 2, the auxiliary search may be performed in V' layers.

Since the optimal transmission beam is represented by a weighting vector $w=\tilde{w}^{el} \otimes \tilde{w}^{az}$, both AoA and AoD can be obtained. Using Eq #4, Eq #10, and Eq #11, the AoA from the RIS 120 to the UE 135 can be found as:

$$(\theta_{h,l}^U, \varphi_{h,l}^U) = \left(\sin^{-1}\left(\frac{-\lambda}{\tau}\left\lfloor\frac{k\tau}{K}\right\rfloor\right), \sin^{-1}\left(\frac{-\lambda}{\tau}\left\lfloor\frac{k\tau}{2K-2}\right\rfloor\right)\right). \quad \text{(Eq #12)}$$

In other words, the AoA and AoD correspond to direction of the best receiver (UE) and transmitter (RIS) beams found in the beamforming training.

In the present model, the RIS 120 is considered to be located near to UE 135. Consequently, it may be assumed that the antenna array of the UE is always parallel to the RIS, hence $(\theta_{h,l}^R, \varphi_{h,l}^R)=(\theta_{h,l}^U, \varphi_{h,l}^U)$ applies. In other words, it may be estimated that the AoD of the signals at the configurable surface is equal to the AoA at the receiving device. In general, the AoD of the signals at the configurable surface may be estimated from or based on the AoA at the receiving device. This may be based on some prior knowledge or estimation of geometry (such as mutual position) of the RIS and the UE.

Once the modified matrix $\hat{G}$ is estimated, according to some embodiments, the modified channel matrix $\hat{H}$ is determined by an iterative reweighting algorithm. It is noted that the present disclosure is not limited to the iterative reweighting algorithm. The separation of the two matrices for the BS-RIS channel and the RIS-UE channel makes it possible to employ any other estimation/determination algorithm for the determination of the matrix $\hat{H}$.

The result of the estimation may be used in many different ways. For example, the channel estimation may be used at the UE for channel equalization. Alternatively or in addition, the UE may report the channel estimation or some estimated channel parameters to the base station and the base station may take an appropriate action. For example, the base station may configure its own transmission characteristics accordingly, such as the departure angle, and/or transmission power, and/or beamforming pattern.

In some embodiments, the trained reflection coefficients are configured by the transmitting device. It is noted that the estimated channel characteristics may be used to determine a new set of reflection coefficients for the RIS and to configure the RIS accordingly. In some embodiments, the configuration of the RIS may be performed by the BS (transmitting device) in accordance with a channel estimation reported from the UE. However, it is possible to configure the RIS by the UE. Or, as mentioned above, in general, the present disclosure is applicable to communication between any devices such as direct communication between two devices in which there is no hierarchy such as AP-STA or gNB-UE involved. Thus, in principle receiving device or transmission device or both may be allowed to configure the RIS based on the channel estimation by re-setting the reflection coefficients of the RIS.

As described above, in some embodiments, the beamforming search comprises a hierarchic beamforming search comprising a first stage in which the beamforming search is performed in a plurality, V, of layers, wherein for each current layer following the first layer of the plurality of layer: (1) a predefined number of beams is searched to find the best beam in the current layer, wherein beams of the predefined number of beans searched are selected based on the best beam of the layer immediately preceding the current layer; and (2) in the current layer the number of antennas contributing to the beamforming is increased compared to the layer immediately preceding the current layer. In general, the search may end with the primary search and the best beam found therein may be taken to estimate the AoA and AoD, the channel and/or reflection coefficients. Alternatively, some further search may be performed based on the best beam found in the primary search. The present disclosure is not limited to any particular further beam search.

Nevertheless, in some embodiments, as mentioned above, the hierarchic beamforming search further comprises a second stage in which a plurality of beams in the vicinity of the beam found after the first stage are searched. This secondary search (second stage search) may search a predetermined number b of beams in the vicinity of the best beam. Such search may be performed iteratively, more than one time, i.e. in V' layers. For example, in each layer of such secondary search, the best beam from the previous layer is taken and b beams in the vicinity of the best beam are searched. This may be performed a predefined and fixed number of times (e.g. V') and/or the search may terminate if the received quality (e.g. SNR or SINR or other channel quality measure) degrades.

Estimation of "Ideal" Reflection Coefficients

In general, the ideal reflection coefficients of the configurable surface 120 may be estimated, based on the trained reflection coefficients of the configurable surface 120 and the obtained AoA at the receiving device 135. Here, it should be noted that the term "ideal reflection coefficients" refers to reflection coefficients of the configurable surface in case of an ideal channel BS-RIS. The term "ideal channel" here refers to a channel with a unitary gain (e.g., all coefficients of the corresponding channel matrix have an absolute value of one).

The ideal reflection coefficients may be estimated based on the formulas $$vec(\phi) = \Lambda_x(\theta_t, \varphi_t, \theta_{des}, \varphi_{des}) \otimes \Lambda_y(\theta_t, \varphi_t, \theta_{des}, \varphi_{des}) \quad \text{(Eq #13)}$$

$$\Lambda_x = \left[e^{j\frac{-N_{RIS}}{2}\frac{2\pi}{\lambda}dx(\Gamma_x)}, \ldots, e^{j\frac{N_{RIS}}{2}\frac{2\pi}{\lambda}dx(\Gamma_x)}\right]^T \quad \text{(Eq #14)}$$

-continued and $$\Lambda_y = \left[ e^{j\frac{-N_{RIS}}{2}\frac{2\pi}{\lambda}dy(\Gamma_y)}, \ldots, e^{j\frac{N_{RIS}}{2}\frac{2\pi}{\lambda}dy(\Gamma_y)} \right]^T.$$

where $$\Gamma_x = \sin\theta_t\cos\varphi_t + \sin\theta_{des}\cos\varphi_{des}, \quad \text{(Eq \#15)}$$

$$\Gamma_y = \sin\theta_t\sin\varphi_t + \sin\theta_{des}\sin\varphi_{des}, \text{ and}$$

$\Lambda_x(.)$ and $\Lambda_y(.)$ can be viewed as steering vectors on the azimuth and the elevation direction, respectively. It is noted that the indices x and y denote location of the RIS elements (within the plane of the planar RIS). Furthermore, ($\theta_{des}$, $\varphi_{des}$) are respectively elevation and azimuth destination angles (herein corresponding to ($\theta_{h,l}^R$, $\varphi_{h,l}^R$)), and ($\theta_t$, $\varphi_t$) are respectively elevation and azimuth angles incident on the RIS (herein corresponding to ($\theta_{g,l}^R$, $\varphi_{g,l}^R$)). Moreover, j is the imaginary unit, $\lambda$ the wavelength of the signal, dx is a separation between elements of the configurable surface in an x-direction (e.g. vertical), dy (e.g., horizontal) is a separation between elements of the configurable surface in an y-direction. In particular, the y-direction and the x-direction may be perpendicular with respect to each other.

In general, the ideal reflection coefficients may be estimated based on an AoA at the configurable surface.

For instance, the reflection coefficients may be estimated according to the formulas $$\phi_{n,m}(\theta_{AoA}^R, \varphi_{AoA}^R, \theta_{AoD}^R, \varphi_{AoD}^R) = \gamma_{n,m}e^{j\alpha_{n,m}}, \text{ and} \quad \text{(Eq \#16)}$$

$$\angle\phi_{n,m} = \alpha_{n,m} = \mathrm{mod}\left(\frac{-2\pi}{\lambda}\left[\left(m - \frac{1}{2}\right)\Gamma_x dx + \left(n - \frac{1}{2}\right)\Gamma_y dy\right], 2\pi\right),$$

$\phi_{n,m}$ is the reflection coefficient of the (n, m)-th element of the configurable surface, $\gamma_{n,m}$ is the reflection gain of the (n, m)-th element of the configurable surface, the $\gamma_{n,m}$ being predetermined, j is the imaginary unit ($j^2=-1$), $\lambda$ the wavelength of the signal, dx is the separation between elements of the configurable surface in an x-direction, dy is the separation between elements of the configurable surface in an y-direction, $\theta_{AoA}^R$ is the predetermined elevation AoA at the configurable surface, $\varphi_{AoA}^R$ is the predetermined azimuth AoA at the configurable surface, $\theta_{AoD}^R$ is the elevation AoD of the estimated AoD at the configurable surface, and $\varphi_{AoD}^R$ is the azimuth AoD of the estimated AoD at the configurable surface.

Here, $\theta_{AoA}^R$ is an elevation AoA at the configurable surface, $\varphi_{AoA}^R$ is an azimuth AoA at the configurable surface. As mentioned above, $\theta_{AoD}^R$ is an elevation AoD at the configurable surface, $\varphi_{AoD}^R$ is an azimuth AoD at the configurable surface, and these may be obtained by the beamforming training. Then, $\theta_{AoA}^R$ and/or $\varphi_{AoA}^R$ may be obtained by approximation and/or taking into account previous knowledge about mutual position of the BS and RIS. For example, in some infrastructure based wireless networks, the location of the BS may be fixed and known to the BS. Moreover, the location of the RIS may be known to the BS. The BS may control and have knowledge of both the orientation of the own UPA and the UPA of the RIS. Consequently, based on the geometry of the BS and RIS (approximated, measured or known), the AoAs at the RIS ($\theta_{AoA}^R$, $\varphi_{AoA}^R$) as well as the AoDs from the base station ($\theta_{AoD}^R$, $\varphi_{AoD}^R$) may be obtained. In a simplified model, for example, the AoA may be considered to be 0 (at least the elevation). However, such assumption is not necessary, and any other geometry may be considered. Equivalently to (Eq #16), the reflection coefficients may be estimated according to the following formula:

$$\angle\phi_{n,m} = \alpha_{n,m} = \mathrm{mod}\left(\frac{-2\pi}{\lambda}\left[\left(m - \frac{1}{2}\right)(\sin\theta_{AoA}^R\cos\varphi_{AoA}^R + \sin\theta_{AoD}^R\cos\varphi_{AoD}^R)dx + \left(n - \frac{1}{2}\right)(\sin\theta_{AoA}^R\sin\varphi_{AoA}^R + \sin\theta_{AoD}^R\sin\varphi_{AoD}^R)dy\right], 2\pi\right)$$

Further details concerning some exemplary, possible modelling of channels can be found in the above mentioned paper by W. Tang at al.

Estimating $\hat{G}$

In general, the characteristics of the channel BS-RIS between the transmitting device 110 and the configurable surface 120 may be the method, according to a relation between (or a relation involving) the trained reflection coefficients and the estimated reflection coefficients.

More specifically, if the RIS phases are set to direct the beam of the reflected signal toward the UE's location ($\theta_{h,l}^R$, $\varphi_{h,l}^R$), then the beam would be distorted and the radiation is shifted toward a different direction due to the effect of channel $\hat{G}$. Mathematically this could expressed as $$\hat{H}\Theta^V\hat{G}=\hat{H}\Theta(\theta_{g,l}^R,\varphi_{g,l}^R,\theta_{h,l}^R,\varphi_{h,l}^R)G_{opt}, \quad \text{(Eq \#17)}$$

where $G_{opt}$ is the channel matrix corresponding to an optimal (or ideal) channel between base station and RIS, which is the channel with a single path without any fading. In accordance with (Eq #3), $G_{opt}$ may be written as $$G_{opt}=z_{g,opt}\alpha_{M_{RIS}}(\theta_{AoA}^R,\varphi_{AoA}^R)\alpha_{M_{BS}}^H(\theta_{AoD}^B,\varphi_{AoD}^B),$$

where $\theta_{AoD}^B$ and $\varphi_{AoD}^B$ are respectively the elevation and azimuth AoD at the base station for the ideal channel, $\theta_{AoA}^R$ and $\varphi_{AoA}^R$ are respectively the elevation and azimuth AoAs at the configurable surface for the ideal channel, and the $\alpha_{M_i}$ are array response vector as, for instance, defined in (Eq #4). The angels $\theta_{AoA}^R$, $\varphi_{AoA}^R$, $\theta_{AoD}^B$, and $\varphi_{AoD}^B$ may be known from the geometry of the deployment of the RIS and the base station. In particular, said angles may be obtained based on the position of the base station, the position of the RIS, the orientation of the UPA of the base station, and/or the orientation of the UPA of the RIS. It is further noted that, in general, $z_{g,opt}$ may be used to normalize the channel matrix $G_{opt}$ arbitrarily (e.g. as appropriate). For instance, as already assumed above, the channel matrix may be normalized to have unitary gain. Accordingly, $z_{g,opt}$ may depend on the definition (and, in particular, the normalization) of the $\alpha_{M_{RIS}}$. For instance, $z_{g,opt}$ may be set to one ($z_{g,opt}=1$) or set to $z_{g,opt}=\sqrt{M_{BS}M_{RIS}}$.

The ideal channel may thus be the free space channel or a channel that has only one non-zero component. For example, the ideal channel's impulse response may be an impulse, which means that the signal is delayed, attenuated, or amplified but not distorted. In some cases, the channel matrix of the ideal channel may be considered to be, in addition, unitary.

Furthermore, $\Theta^{V'}$ is the last configured set of phases by the BS at the V'-th stage of beam searching process The angle $\theta_{g,l}{}^R$, $\varphi_{g,l}{}^R$, is the AoA at the RIS denoted as $\theta_{AoA}{}^R$, $\varphi_{AoA}{}^R$ above in the elevation and azimuth directions. In other words, the angle may be different for different paths, in case there are multiple paths between the BS and the RIS. Moreover, $\theta_{h,l}{}^R$, $\varphi_{h,l}{}^R$ is an AoD at the RIS and is denoted as $\theta_{AoD}{}^R$, $\varphi_{AoD}{}^R$ above. The AoD may be also different for different paths, in case there are multiple paths between the RIS and the UE.

By exploiting the angles obtained from (Eq #12) and by substituting them in (Eq #13) below, $\hat{G}$ can be estimated directly as $$\hat{G}=(\Theta^V)^{-1}\Theta(\theta_{g,l}{}^R,\varphi_{g,l}{}^R,\theta_{h,l}{}^R,\varphi_{h,l}{}^R)G_{opt}(\theta_g{}^R,\varphi_g{}^R,\theta_g{}^B,\varphi_g{}^B), \quad \text{(Eq #18)}$$

or, equivalently, written using a simplified notation disregarding the possibly multiple paths $$\hat{G}=(\Theta^V)^{-1}\Theta(\theta_g{}^R,\varphi_g{}^R,\theta_h{}^R,\varphi_h{}^R)G_{opt}(\theta_g{}^R,\varphi_g{}^R,\theta_g{}^B,\varphi_g{}^B),$$

where $\theta_g{}^B$ and $\varphi_g{}^B$ are respectively the elevation azimuth AoD from the base station (here also denoted as $\theta_{AoD}{}^B$ and $\varphi_{AoD}{}^B$); $\theta_g{}^R$ and $\varphi_g{}^R$ are respectively the elevation azimuth AoA at the RIS (here also denoted as $\theta_{AoA}{}^R$ and $\varphi_{AoA}{}^R$); and $\theta_h{}^R$ and $\varphi_h{}^R$ are respectively the elevation azimuth AoD from the RIS (here also denoted as $\theta_{AoD}{}^R$ and $\varphi_{AoD}{}^R$).

It is noted that for known (e.g. predefined, estimated or given by a known geometry) angles $\theta_{AoA}{}^R$, $\varphi_{AoA}{}^R$ (Eq #18) becomes $\hat{G}=(\Theta^V)^{-1}\Theta(\theta_{AoD}{}^R, \varphi_{AoD}{}^R)G_{opt}$.

By adopting this design, the effect of channel G is known and controlled by the RIS simply by setting $\Theta=\Theta^V$ which results in:

$$\hat{H}\Theta\hat{G} = \hat{H}\Theta^{V'}(\Theta^{V'})^{-1}\Theta(\theta_{h,l}^R, \varphi_{h,l}^R)G_{opt}, = \hat{H}\Theta(\theta_{h,l}^R, \varphi_{h,l}^R)G_{opt}, \quad \text{(Eq #19)}$$

where $\Theta(\theta_{h,l}{}^R, \varphi_{h,l}{}^R)$ may be set for any desired location $\theta_{des}$, $\varphi_{des}$, and the channel estimation problem is reduced to estimate $\hat{H}$ only.

In other words, according to some embodiments, the estimated characteristics of the non-ideal channel (BS-RIS) are a modified channel matrix $\hat{G}$ obtained in accordance with the relation (Eq #18), wherein:
- $\Theta(\theta_{AoA}{}^R, \varphi_{AoA}{}^R, \theta_{AoD}{}^R, \varphi_{AoD}{}^R)$ is the diagonal matrix comprising the estimated reflection coefficients on its diagonal, $\Theta=\text{diag}\{\text{vec}(\phi_{nm})\}$;
- $\Theta^{V'}$ is the diagonal matrix comprising the trained reflection coefficients on its diagonal; and
- $(\Theta^{V'})^{-1}$ is the inverse matrix of the diagonal matrix $\Theta^{V'}$.

In some embodiments, as mentioned above, the effect of $\hat{G}$ is known and its effects may be cancelled at the RIS. For example, the RIS may be configured (e.g. by the BS and/or by the UE) with the reflection coefficients $\Theta$ as follows:

$$\Theta=\Theta(\theta_{AoA}{}^R,\varphi_{AoA}{}^R,\theta_{des},\varphi_{des})G_{opt}\hat{G}^H(\hat{G}\hat{G}^H)^{-1}$$

This is obtained by the following consideration: in order to cancel the effect of $\hat{G}$ the outcome of the effective channel should be given as in Eq #19, which is equivalent to:

$$\Theta\hat{G}=\Theta(\theta_{AoA}{}^R,\varphi_{AoA}{}^R,\theta_{des},\varphi_{des})G_{opt}$$

Then the following may be found:

$$\Theta\hat{G}\hat{G}^H=\Theta(\theta_{AoA}{}^R,\varphi_{AoA}{}^R,\theta_{des},\varphi_{des})G_{opt}\hat{G}^H$$

$$\Theta(\hat{G}\hat{G}^H)(\hat{G}\hat{G}^H)^{-1}=\Theta(\theta_{AoA}{}^R,\varphi_{AoA}{}^R,\theta_{des},\varphi_{des})G_{opt}\hat{G}^H(\hat{G}\hat{G}^H)^{-1}$$

In general, the reflection coefficients of the configurable surface (120) may also be set according to $\Theta=\Theta(\theta_{AoA}{}^R,$ $\varphi_{AoA}{}^R, \theta_{des}, \varphi_{des}(\Theta(\theta_{AoA}{}^R, \varphi_{AoA}{}^R, \theta_{AoD}{}^R, \varphi_{AoD}{}^R))^{-1}\Theta^{V'}$, which may be derived from the above equations in combination with (Eq #18).

To control the RIS, in this way, only G is needed to be compensated (e.g. by setting the reflection coefficients as shown above). H is left to the user (e.g. UE) to be estimated. In other words, in some embodiments, the BS may control the RIS reflection coefficients to compensate for the estimated channel $\hat{G}$. Thus, the phase modification of the channel between the BS and the RIS may be compensated for by adapting the reflection coefficients of the RIS. The remaining impact of the channel between the RIS and the UE, as well as the power on the channel between the BS and the RIS may be compensated for by the UE in terms of estimating the modified channel matrix.

In particular, the UE (in general, the receiving device) may be configured to signal to the BS (in general, the transmitting device) some information regarding the channel estimation. For example, such information may be, for instance, the best beam found, and/or the best AoA at the UE found in beam search, and/or the estimated refection coefficients or the like. Correspondingly, the BS (in general, the transmitting device) may be configured to receive the information and to configure the reflection coefficients of the configurable surface accordingly.

Estimation of the RIS-UE channel $\hat{H}$

Without loss of generality, assuming one RF chain is activated at the BS side and Z symbols are transmitted, channel estimation model given in C. Hu, L. Dai, T. Mir, Z. Gao, and J. Fang, "*Super-resolution channel estimation for mmwave massive MIMO with hybrid precoding,*" IEEE Transactions on Vehicular Technology, vol. 67, no. 9, pp. 8954-8958,2018 (incorporated herein by reference) is adopted here to estimate path gains of all paths. It is noted that this estimation is only exemplary and that other approaches may be applied to estimate the RIS-UE channel with the knowledge of the estimated phases of the BS-RIS channel.

The system model is given as:

$$y=Q^H H_{eff}Fs+Q^H n, \quad \text{(Eq #20)}$$

wherein $y\in\mathbb{C}^{Z\times 1}$ is the received signal at UE 135; where $Q\in\mathbb{C}^{M_{UE}\times Z}$ and $F\in\mathbb{C}^{M_{BS}\times Z}$ are the hybrid combining and the precoder matrices, respectively. The received signal at the UE can be explicitly expressed as $$y=\beta(d_g,d_h,\theta_{des},\varphi_{des})Q^H\hat{H}\Theta\hat{G}Fs+Q^H n. \quad \text{(Eq #21)}$$

Assuming $x=\Theta\hat{G}Fs\in\mathbb{C}^{M_{RIS}\times 1}$, where each element $x_i$ is the i-th transmitted symbol. For channel estimation, known symbols at known indices are transmitted. Each received signal corresponding to the transmitted pilot symbol at time slot u is given as:

$$y_{p,u}=\beta(d_g,d_h,\theta_{des},\varphi_{des})q_u{}^H\hat{H}x_{p,u}+q_u{}^H n_{p,u}. \quad \text{(Eq #22)}$$

Within U time slots, $U_p$ different pilot sequences are sent in each time slot, and $$y_p=\beta(d_g,d_h,\theta_{des},\varphi_{des})Q^H\hat{H}x_p+Q^H n_p, \text{ where}$$

$y_p=[y_{p,1}, y_{p,2}, \ldots, y_{p,U}]^T$ and $Q=[q_1, q_2, \ldots, q_U]^T$. By setting $Y=[y_1, y_2, \ldots, y_p, \ldots, y_{U_p}]^T$, $X=[x_1, x_2, \ldots, x_{U_p}]^T$, and $N=[n_1, n_2, \ldots, n_{U_p}]^T$, we get $$Y=Q^H\hat{H}X+Q^H N. \quad \text{(Eq #23)}$$

Using the fact that the mmWave channel is sparse, the estimation of the channel $\hat{H}$ becomes equivalent to the estimation of z, $\Psi_U$ and $\Psi_R$, and the problem is formulated as:

$$\min_{z, \Psi_U, \Psi_R} P_1(z, \Psi_U, \Psi_R) \triangleq \|\hat{z}\|_0, \text{ s.t. } \|Y - Q^H \tilde{H} X\|_F \leq \epsilon \quad \text{(Eq \#24)}$$

where $\|\hat{z}\|_0$ represents the number of non-zero elements i.e., the sparsest solution of the sparse channel $\tilde{H}$, $\tilde{H}$ is the estimated channel matrix for $\hat{H}$, and $\epsilon$ is the estimation error tolerance. $\|.\|_F$ denotes Frobenius norm.

Since the log-sum penalty is more sparsity encouraging, the log-norm instead of $\|\hat{z}\|_0$ can be used here, see for instance J. Fang, F. Wang, Y. Shen, H. Li, and R. S. Blum, "*Super-resolution compressed sensing for line spectral estimation: An iterative reweighted approach,*" IEEE Transactions on Signal Processing, vol. 64, no. 18, pp. 4649-4662, 2016. In addition, both $\Psi_U$, $\Psi_R$ are already obtained in the previous section using the beam searching algorithm, therefore the optimization is performed according to z only, and the problem $P_1$ is given as:

$$\min_z P_2(z) \triangleq \sum_{l=1}^{L_h} \log(|\hat{z}_l|^2 + \delta), \text{ s.t. } \|Y - Q^H \tilde{H} X\|_F \leq \epsilon \quad \text{(Eq \#25)}$$

where $\delta$ ensures that the logarithmic function is always in its domain of definition. In addition to minimizing the number of paths, minimizing the channel estimation error is needed. Therefore, a regularization parameter $\zeta > 0$ is added, and $P_2$ is reshaped to the following optimization problem:

$$\min_z P_3(z) \triangleq \sum_{l=1}^{L_h} \log(|\hat{z}_l|^2 + \delta) + \zeta \cdot \|Y - Q^H \tilde{H} X\|_F \quad \text{(Eq \#26)}$$

It turned out that the minimization of $P_3$ is equivalent to the minimization of the iterative surrogate function, as can be also seen in the paper by J. Fang et al. mentioned above $$\min_z P_4^{(i)}(z) \triangleq \zeta^{-1} z^H D^{(i)} z + \|Y - Q^H \tilde{H} X\|_F \quad \text{(Eq \#27)}$$

where $D^{(i)}$ is expressed as $$D^{(i)} = \text{diag}\left( \frac{1}{|\hat{z}_1^{(i)}|^2 + \delta}, \frac{1}{|\hat{z}_2^{(i)}|^2 + \delta}, \cdots, \frac{1}{|\hat{z}_{L_h}^{(i)}|^2 + \delta} \right) \quad \text{(Eq \#28)}$$

and $\hat{z}^{(i)}$ is the estimate of z at the $i^{th}$ iteration. Then, the optimization of (Eq #27) becomes as follows $$P_4^{(i)}(z) = \zeta^{-1} z^H D^{(i)} z + \sum_{p=1}^{U_p} \|y_p - T_p z\|_2^2, \quad \text{(Eq \#29)}$$

$$T_p = Q^H a_{M_{UE}}(\Psi_U) a_{M_{RIS}}^H(\Psi_R) x_p.$$

where $$P_4^{(i)}(z) = \zeta^{-1} z^H D^{(i)} z + \sum_{p=1}^{U_p} (y_p - T_p z)^H (y_p - T_p z) = \quad \text{(Eq \#30)}$$

$$z^H \left( \zeta^{-1} D^{(i)} + \sum_{p=1}^{U_p} T_p^H T_p \right) z -$$

$$z^H \left( \sum_{p=1}^{U_p} T_p^H y_p \right) - \left( \sum_{p=1}^{U_p} y_p^H T_p \right) z + \left( \sum_{p=1}^{U_p} y_p^H y_p \right)$$

For optimizing (Eq #30), the next step is obtained $$\frac{\partial P_4^{(i)}(z)}{\partial z} = z^H \left( \zeta^{-1} D^{(i)} + \sum_{p=1}^{U_p} T_p^H T_p \right) - \left( \sum_{p=1}^{U_p} y_p^H T_p \right) = 0 \quad \text{(Eq \#31)}$$

Therefore, the optimal $\hat{z}$ that corresponds to the best estimation of $\tilde{H}$ at the $i^{th}$ iteration is given by $$z_{opt}^{(i)} \triangleq \left( \zeta^{-1} D^{(i)} + \sum_{p=1}^{U_p} T_p^H T_p \right)^{-1} \left( \sum_{p=1}^{U_p} T_p^H y_p \right) \quad \text{(Eq \#32)}$$

$$\triangleq \left( \zeta^{-1} D^{(i)} + \sum_{p=1}^{U_p} T_p^H T_p \right) \left( \sum_{p=1}^{U_p} y_p^H T_p \right)^{-1}$$

In this iterative method $\zeta$ is designed to be adaptive to fit both a sparser estimation and a fast search.

$$\zeta = \min\left( \frac{\varpi}{r^{(i)}}, \zeta_{\{max\}} \right), \quad \text{(Eq \#33)}$$

where $\varpi$ is a scaling factor, $\zeta_{\{max\}}$ makes the problem well conditioned, and $r^{(i)}$ is the square residue of the previous iteration. $\zeta$ is investigated in details in other works such as J. Fang et al. mentioned above.

Channel Tracking

After estimating the channel parameters, i.e., channel coefficients, AoA, and AoD, and since the UE 135 may be mobile, a channel tracking approach may be employed to avoid frequent channel estimation. Channel tracking is typically much faster than the complete channel estimation. They make use of the results from the preceding channel estimation.

There are many possibilities how to perform the channel tracking known in the art. Any of them can be applied in the context of the present disclosure. There are channel tracking algorithms which are significantly fast, reliable, and robust which may allow for an efficient data transfer between transmitters and receivers in mmWave communication systems.

An exemplary channel tracking in mmWave systems is described in C. Zhang, D. Guo, and P. Fan, "*Tracking angles of departure and arrival in a mobile millimeter wave channel,*" in Proc. IEEE International Conference on Communications (ICC), Kuala Lumpur, Malaysia. IEEE, 2016, pp. 1-6 incorporated herein by reference. This channel tracking applies Extended Kalman Filtering (EKF) to track AoA/AoD while the channel coefficients remain constant. The method may provide good results for more stationary environments with low mobility, while some difficulties may arise when the task is to track in a fast-changing channel environment since it requires pre-requisites for a full scan that causes a long time measurement. To decrease the measurement time and to provide an improved tracking algorithm, the authors in V. Va, H. Vikalo, and R. W. Heath, "*Beam tracking for mobile millimeter wave communication systems*," in Proc. IEEE Global Conference on Signal and Information Processing (Global SIP), Washington, DC, USA. IEEE, 2016, pp. 743-747 proposed an alternative solution that requires only a single measurement with EKF estimation and a beam switching design. Additionally, Least Mean Square (LMS) and BiLMS (Bidirectional LMS) algorithms are discussed in Y. Yapici and I. Güvenc, "*Low-complexity adaptive beam and channel tracking for mobile mmWave communications*," in Proc. 52nd Asilomar Conference on Signals, Systems, and Computers, Pacific Grove, CA, USA. IEEE, 2018, pp. 572-576, where advantages of both algorithms are presented compared to EKF algorithm on imperfect CSI conditions, while having faster convergence characteristics as SNR increases. Accordingly, following the above described channel estimation, tracking may be performed by employing an EKF or LMS tracking algorithms as they may provide for low complexity and good performance.

The tracking algorithm starts with setting a pair of transmit and receive beams according to the estimated azimuth and elevation AoA/AoD from the channel estimator. While tracking, the predicted channel parameters should stay close to the actual values, so that the UE 135 stays within half of the beam width. Otherwise, if the tracking is no longer reliable or the path of the beams does not exist anymore, the channel parameters may be re-estimated. In particular, a discrete-time model for the received signal symbol period at the UE side is given in (Eq #21).

Assuming that each vector in F is given by $f = \alpha_{M_{BS}}(\theta, \varphi)$ for the LoS path. In order to start the tracking process, the measurement function should be known. From (Eq #21), the measurement function is used to track the observation signal and can be given as:

$$g_{measure} = \beta(d_g, d_h, \theta_{des}, \varphi_{des}) Q^H \hat{H} \Theta \hat{G} F \quad (Eq\ \#34)$$

where $g_{measure}$ depends on the channel parameters comprising path coefficients, azimuth and elevation AoD/AoA angles from both channels; BS-RIS and RIS-UE. The above mentioned LMS or EKF algorithms may be used to track these parameters.

In summary, a method is provided for tracking a location of a receiving device, the method comprising: the method according to any of embodiments and examples mentioned above for estimating, at the receiving device 135, the characteristics of the channel (BS-UE) between the transmitting device 110 and the receiving device 135, and tracking, based on the estimated characteristics of the channel (BS-UE) between the transmitting device 110 and the receiving device 135 and/or the modified channel matrix $\hat{H}$, the location of the communication device.

Three-Stage Approach Summarized

Figure 4:
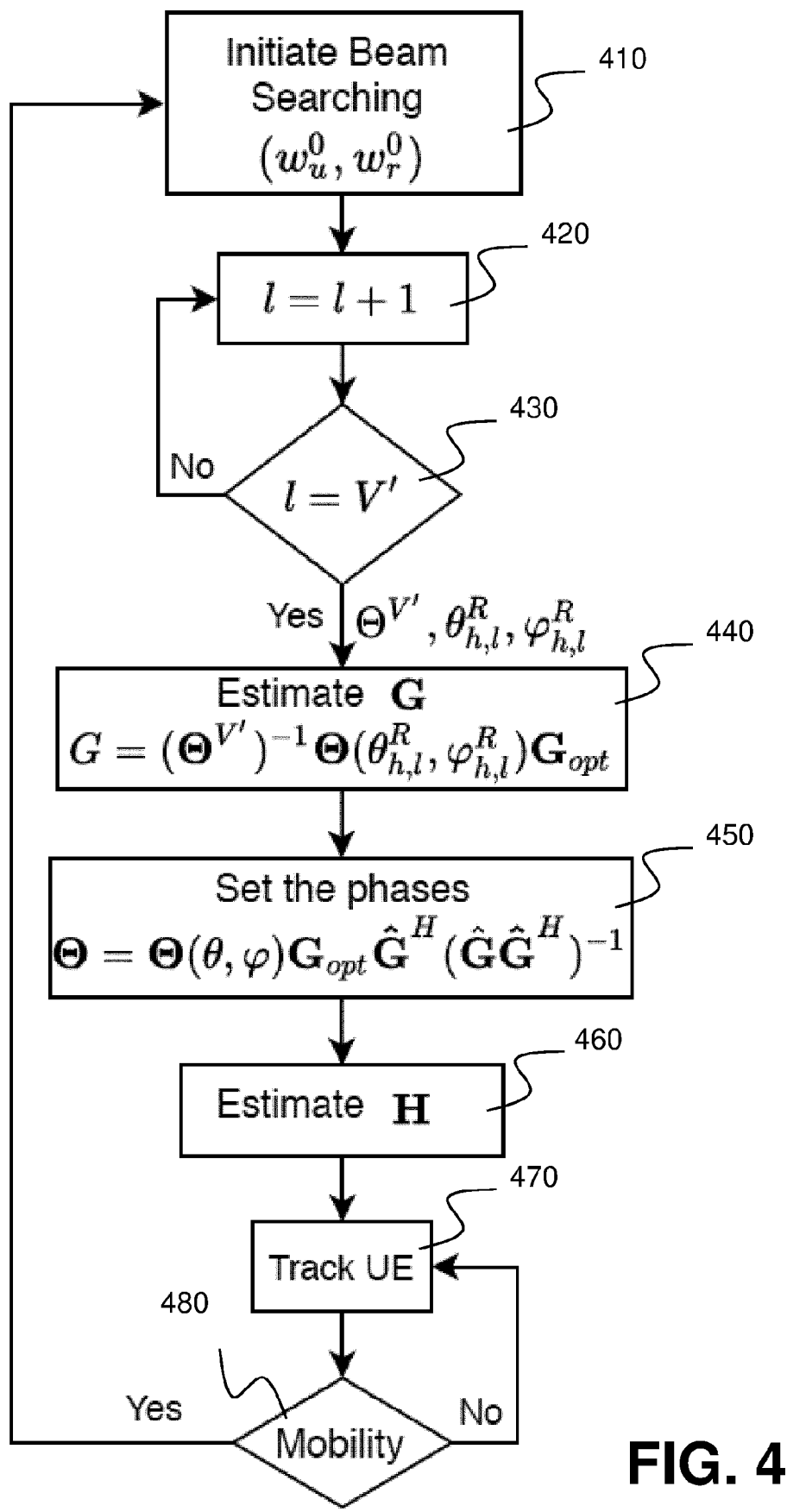
FIG. 4 is a flow diagram illustrating a method for channel estimation and tracking.

FIG. 4 summarizes an exemplary embodiment which makes use of the above-described separate estimation of the channel between the BS and RIS and between the RIS and UE. In such general three-stage framework for the RIS-aided communication networks, all practical issues may be considered in a realistic scenario. The scheme can estimate both BS-RIS and RIS-UE channels separately, even though all RIS elements are passive. Starting with estimating the BS-RIS channel G using hierarchical beam searching algorithm, then, the RIS-UE channel H is estimated by adopting the iterative reweight algorithm to estimate the channel path coefficients only, exploiting the resultant angles from the beam searching algorithm. Then, the proposed scheme enables RIS-assisted communication to track mobile user. The parameters of channel H are tracked, e.g., using well-known algorithms such as extended Kalman filter (EKF) and least mean square (LMS) algorithms.

FIG. 4 shows an exemplary flow chart illustrating the method of the three-stage RIS channel estimation framework.

Stage one is estimation of the BS-RIS channel G. It starts with finding AoA/AoD between the RIS and the UE. This stage comprises the primary beam search (with layers 1 to V) and the auxiliary beam search (with layers 1 to V'). In step 410, the beam search is initiated by layer 1 of the primary search, and continues 420 over V layers of the primary search and the V' layers of the secondary search until secondary search is finished 430.

Figure 5:
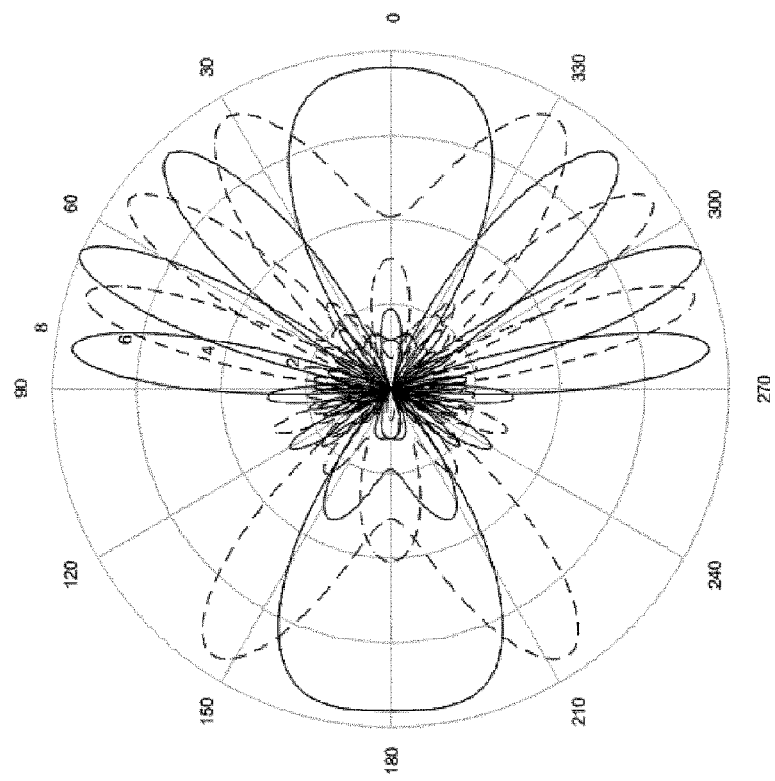
FIG. 5 is a schematic drawing illustrating primary beam patterns for ideal channel G and in azimuth domain (left) and elevation domain (right) when G is a geometric model with paths.
Figure 5:
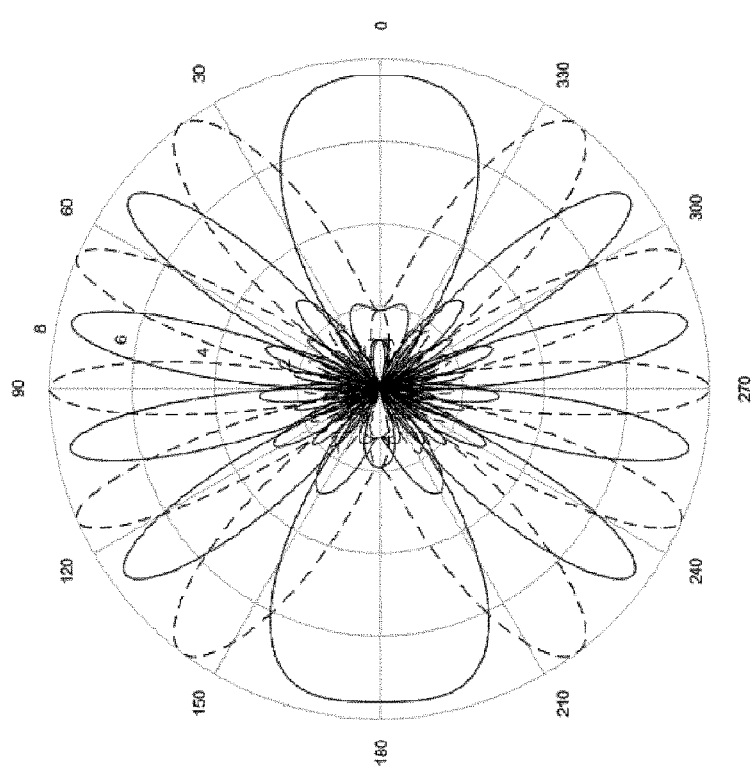

FIG. 5 illustrating primary beam patterns for ideal channel G and in azimuth domain (left) and elevation domain (right) when G is a geometric model with 5 paths. Moreover, in this example, Primary beam patterns $N_{RIS}=8$, $T=5$, $K=10$.

The outputs of this beam searching are $\Theta^{V'}$, and $\theta_{h,l}^R$, $\varphi_{h,l}^R$. Based on these outputs, the modified channel matrix $\hat{G}$, which is a characteristics of the channel between the BS and the RIS, is estimated 440 as shown in Eq #18.

The first stage may further comprise setting 450 the reflection coefficients of the RIS according to:

$$\Theta = \Theta(\theta_{des}, \varphi_{des}) G_{opt} \hat{G}^H (\hat{G}\hat{G}^H)^{-1}.$$

The second stage is estimation 460 of the modified channel matrix $\hat{H}$ between the RIS and the UE. Input to this stage are received signal Y, pilot signal X, combining matrix W, $\Psi_U$, $\Psi_R$, pruning threshold $z_{th}$, and termination threshold $\epsilon$. The output of this stage are path gains of all paths. The exemplary algorithm is sketched below as a high-level pseudo-code, based on the detailed embodiment described above, e.g. with reference to Eq #32 and Eq #33:

---
Initiate $\hat{z}^{(0)} = \hat{z}_{opt} = (\Psi_R, \Psi_U)$
while $\|\hat{z}^{(i+1)} - \hat{z}^{(i)}\| < \epsilon_{th}$ do
  | Update $\zeta$
  | Estimate the path gains $\hat{z}^{(i+1)}$
  | Prune path $l_h$ if $\hat{z}^{(i+1)} < \hat{z}^{(i)}$.
  | $\hat{z} = \hat{z}^{(last)}$.
  | $H = A_{M_{UE}}(\Psi_U) \text{diag}(z) A_{M_{RIS}}^H (\Psi_R)$.
---

The third stage of the framework is tracking 470 the channel parameters of the channel H. Input to the channel tracking 470 are the $z_{opt}$, $\theta$, and $\varphi$. These parameters are updated by using, e.g. the EKF algorithm. For instance, the observation signal is tracked using Eq #34. The updating and tracking are repeated until there is too much mobility 480, in which case the estimation 410-460 is repeated. Here, the term mobility may comprise UE movement, as well as larger changes of the channel contributed by other factors.

It is noted that step 450 of setting the phases of the RIS may be performed but does not have to be performed. It may be performed at any stage, e.g. after the estimation or anytime. The updating or setting the reflection coefficient may be performed according to the following method.

The method for setting reflection coefficients of a configurable surface may comprise performing beamforming search for transmission of signals over a channel (BS-UE) between the transmitting device and a receiving device, the channel comprising reflection on the configurable surface, thereby obtaining the trained reflection coefficients of the configurable surface, and an angle of arrival, AoA, of the signals at the receiving device. The method may further comprise estimating an angle of departure, AoD, of the signals at the configurable surface from the AoA at the receiving device; estimating, based on the configurable surface and the obtained AoA at the receiving device, reflection coefficients of the configurable surface for an ideal channel (BS-RIS) between the transmitting device and the configurable surface; estimating, according to a relation between the trained reflection coefficients and the estimated reflection coefficients, characteristics of a channel (BS-RIS) between the transmitting device and the configurable surface; and setting the reflection coefficients of the configurable surface according to $$\Theta = \Theta(\theta_{AoA}^R, \varphi_{AoA}^R, \theta_{des}, \varphi_{des}) G_{opt} \hat{G}^H (\hat{G}\hat{G}^H)^{-1}, \text{ or}$$

$$\Theta = \Theta(\theta_{AoA}^R, \varphi_{AoA}^R, \theta_{des}, \varphi_{des})(\Theta(\theta_{AoA}^R, \varphi_{AoA}^R, \theta_{AoD}^R, \varphi_{AoD}^R))^{-1} \Theta^{V'},$$

wherein $\Theta^{V'}$ is a diagonal matrix comprising the trained reflection coefficients on its diagonal; $\theta_{des}$ is a target elevation AoD at the configurable surface, $\varphi_{des}$ is a target azimuth AoD at the configurable surface, $\theta_{AoA}^R$ is a predetermined elevation AoA at the configurable surface, $\varphi_{AoA}^R$ is an predetermined azimuth AoA at the configurable surface, $\theta_{AoD}^R$ is an elevation AoD of the estimated AoD at the configurable surface; and $\varphi_{AoD}^R$ is an azimuth AoD of the estimated AoD at the configurable surface.

In summary, estimating G will cancel all the channel effect between the BS and RIS so that the reflected beam direction is easily controlled by changing the phases of RIS. Moreover, by estimating H, accurately recovering the information sent from the BS to the UE may be possible. In other words, the estimated H or Heff may be used for channel equalization.

Implementations in Hardware and Software

Figure 6:
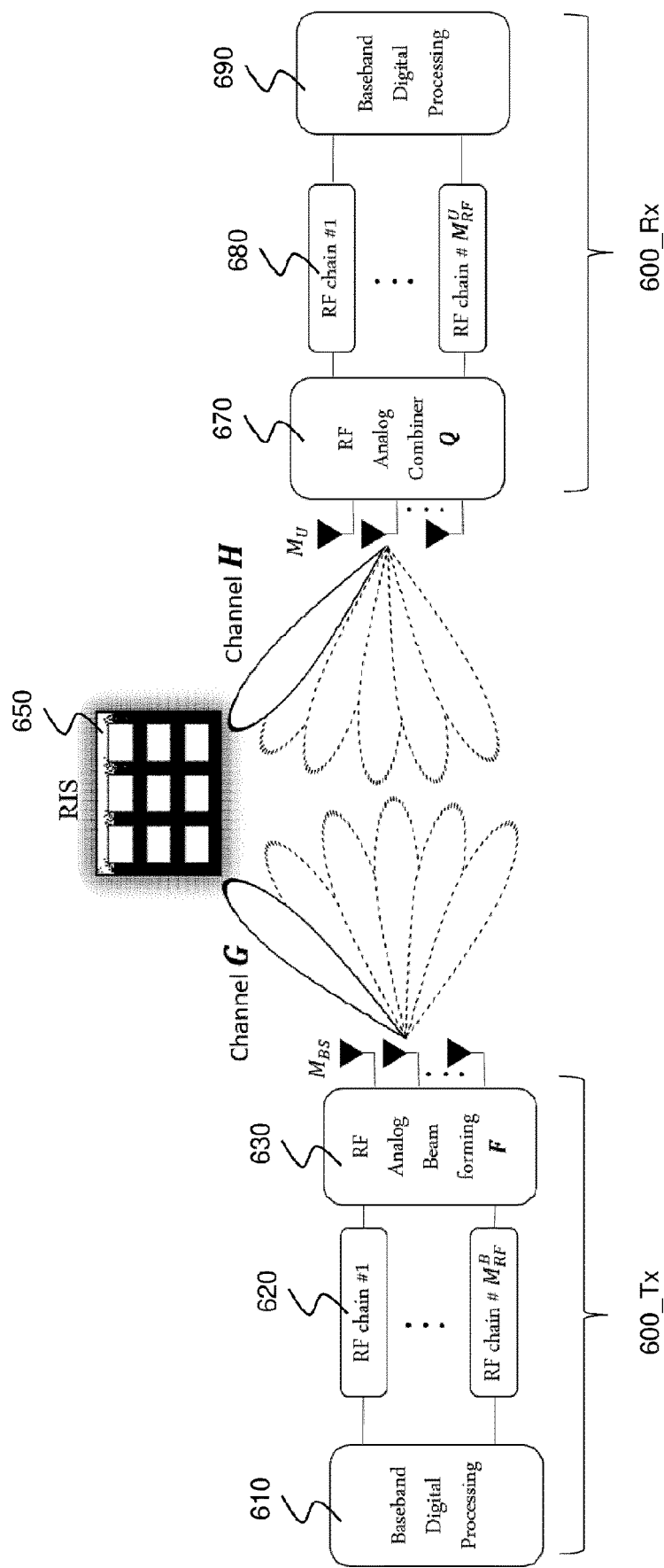
FIG. 6 is a schematic drawing illustrating communication devices at the receiver and the transmitter side of a channel including RIS.

FIG. 6 illustrates exemplary apparatuses which may implement some embodiments. In particular, a receiving device 600_Rx is shown which may comprise an apparatus for channel estimation for estimating, at a receiving device, characteristics of a channel (BS-UE) between a transmitting device and the receiving device, the channel comprising reflection on a configurable surface 650. The channel estimation apparatus may comprise processing circuitry 690 configured to control a transceiver 670-680 of the receiving the device to perform beamforming search for transmission of signals over the channel (BS-UE), thereby obtaining: trained reflection coefficients of the configurable surface 650, and an angle of arrival, AoA, of the signals at the receiving device 600_Rx. The processing circuitry may further estimate, based on the configurable surface and the obtained AoA at the receiving device 600_Rx, reflection coefficients of the configurable surface for an ideal channel (BS-RIS) between the transmitting device and the configurable surface. Moreover, processing circuitry may further estimate, according to a relation between the trained reflection coefficients and the estimated reflection coefficients, characteristics of a channel (BS-RIS) between the transmitting device 600_Tx and the configurable surface.

As can be seen in FIG. 6, in the receiving device 600_Rx, the processing circuitry 690 implements functions of baseband signal processing. The processing circuitry may be a combination of one or more pieces of software and/or hardware. Methods described in the above exemplary embodiments and implementations may be implemented by this baseband signal processing portion. Moreover, the receiving device 600_Rx may comprise a transceiver which may further comprise an analog radio frequency (RF) combiner Q 670 and one or more RF chains 680. The combiner 670 provides the received analog signal to the one or more RF chains.

It is noted that the receiving device 600_Rx may comprise further parts as is known to those skilled in the art, such as parts performing coding and modulation and the like.

Moreover, FIG. 6 shows a transmitting device 600_Tx is provided which may be capable of setting reflection coefficients of a configurable surface 650. Such transmitting device 600_Tx may comprise processing circuitry 610. The processing circuitry may perform functions of baseband digital processing. The baseband processing may comprise (the processing circuitry 610 may be configured for) performing beamforming search for transmission of signals over a channel (BS-UE) between the transmitting device 600_Tx and a receiving device 600_Rx, the channel comprising reflection on the configurable surface, thereby obtaining: trained reflection coefficients of the configurable surface, and an angle of arrival, AoA, of the signals at the receiving device.

The processing circuitry (baseband digital processing) may further implement estimating an angle of departure, AoD, of the signals at the configurable surface from the AoA at the receiving device; estimating, based on the configurable surface and the obtained AoA at the receiving device, reflection coefficients of the configurable surface for an ideal channel (BS-RIS) between the transmitting device and the configurable surface; and estimating, according to a relation between the trained reflection coefficients and the estimated reflection coefficients, characteristics of a channel (BS-RIS) between the transmitting device and the configurable surface.

Based on the above estimated values, the baseband digital signal processing may further comprise setting the reflection coefficients of the configurable surface (120) according to $\Theta = \Theta(\theta_{AoA}^R, \varphi_{AoA}^R, \theta_{des}, \varphi_{des})(\Theta(\theta_{AoA}^R, \varphi_{AoA}^R, \theta_{AoD}^R, \varphi_{AoD}^R))^{-1} \Theta^{V'}$, wherein $\Theta^{V'}$ is a diagonal matrix comprising the trained reflection coefficients on its diagonal; $\theta_{des}$ is a target elevation AoD at the configurable surface, $\varphi_{des}$ is a target azimuth AoD at the configurable surface, $\theta_{AoA}^R$ is a predetermined elevation AoA at the configurable surface, $\varphi_{AoA}^R$ is an predetermined azimuth AoA at the configurable surface, $\theta_{AoD}^R$ is an elevation AoD of the estimated AoD at the configurable surface; and $\varphi_{AoD}^R$ is an azimuth AoD of the estimated AoD at the configurable surface.

As can be seen in FIG. 6, the transmitting device 600_Tx may further comprise a transceiver. The transceiver may comprise one or more RF chains 620 and analog beamforming module 630 which receives the signal from the RF chains 620 and generates the analog beamformed signal which is then transmitted from the UPA of the transmitting device 600_Tx towards the configurable surface 650 for the receiving device 600_Rx.

It is noted that even though some examples above were described with transmitting device being a base station and the receiving device being a user equipment, this may be reversed. In addition, in some embodiments, each BS and UE may implement both a receiving device and a transmitting device described above.

Figure 3B:
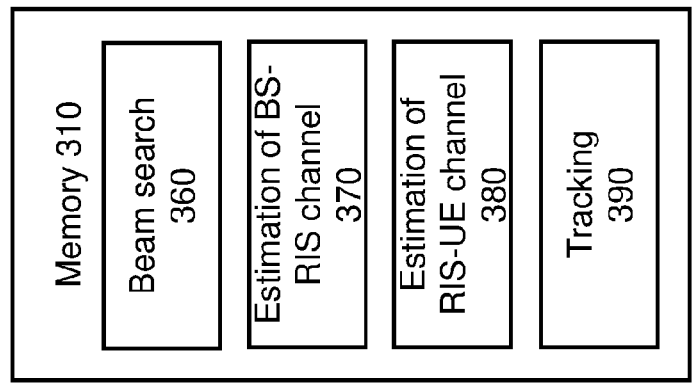
FIGS. 3A and 3B are block diagrams illustrating an exemplary implementation of an apparatus for channel estimation.
Figure 3A:
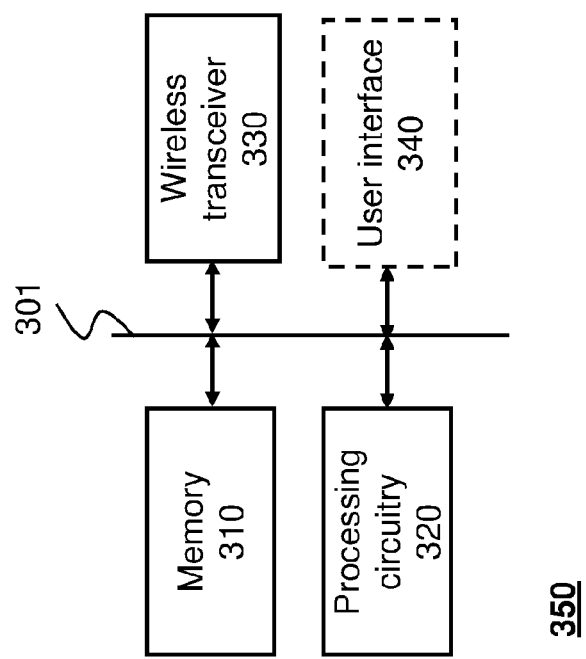

An exemplary hardware structure of a transmitting and/or receiving device is shown in FIG. 3A. FIG. 3A illustrates a device 350 according to some exemplary embodiments. The device 350 comprises memory 310, processing circuitry 320, and a wireless transceiver 330, which may be capable of communicating with each other via a bus 301. The device 350 may further comprise a user interface 340. However, for some applications, the user interface 340 is not necessary (for instance some devices for machine-to-machine communications or the like). The device 350 may be, for instance a wireless module such as 5G or Wi-Fi or the like being a part of a computer such as laptop or tablet, it may be part of a mobile phone, smartphone or other portable/personal device, or the like.

The memory 310 may store a plurality of firmware or software modules, which implement some embodiments of the present disclosure. The memory may 310 be read from by the processing circuitry 320. Thereby, the processing circuitry may be configured to carry out the firmware/software implementing the embodiments. The processing circuitry 320 may comprise one or more processors, which in operation perform the steps of any of the above describe methods. This corresponds to the transmitting device (apparatus) comprising the corresponding functional modules (units).

FIG. 3B shows a schematic functional block diagram of the memory 310 and the functional code parts stored therein. The functional code parts, when executed on the processor (s) 320, perform the respective functions as follows. Application code 360 implements the beam search (for example the primary and the secondary beam search). Application code 370 implements an estimation of the channel between the BS and the RIS. Application code 380 implements an estimation of the channel between the RIS and the UE. Application code 390 may implement channel tracking. These functions of the application codes 360-390 have been already described above. The methodologies described herein (at the transmitter side and the received side) may be implemented by various means depending upon the application. For example, these methodologies may be implemented in hardware, operation system, firmware, software, or any combination of two or all of them. For a hardware implementation, any processing circuitry may be used, which may comprise one or more processors. In particular, the hardware may comprise one or more of application specific integrated circuits (ASICs), digital signal processors (DSPs), digital signal processing devices (DSPDs), programmable logic devices (PLDs), field programmable gate arrays (FPGAs), processors, controllers, any electronic devices, or other electronic circuitry units or elements designed to perform the functions described above.

If implemented as program code, the functions performed by the transmitting apparatus (device) may be stored as one or more instructions or code on a non-transitory computer readable storage medium such as the memory 310 or any other type of storage. The computer-readable media comprises physical computer storage media, which may be any available medium that can be accessed by the computer, or, in general by the processing circuitry 320. Such computer-readable media may comprise RAM, ROM, EEPROM, optical disk storage, magnetic disk storage, semiconductor storage, or other storage devices. Some particular and non-limiting examples comprise compact disc (CD), CD-ROM, laser disc, optical disc, digital versatile disc (DVD), Blu-ray (BD) disc or the like. Combinations of different storage media are also possible—in other words, distributed and heterogeneous storage may be employed.

The embodiments and exemplary implementations mentioned above show some non-limiting examples. It is understood that various modifications may be made without departing from the claimed subject matter. In particular, modifications may be made to adapt the examples to new systems and scenarios without departing from the central concept described herein.

Summary of the Embodiments

According to a first aspect, a method for estimating, at a receiving device (135), characteristics of a channel (BS-UE) is provided. The channel is between a transmitting device (110) and the receiving device (135) and comprises reflection on a configurable surface (120). The method comprising performing beamforming search for transmission of signals over the channel (BS-UE), thereby obtaining i) trained reflection coefficients of the configurable surface (120), and ii) an angle of arrival (AoA) of the signals at the receiving device (135). Furthermore, the method comprises estimating, based on the trained reflection coefficients of the configurable surface (120) and the obtained AoA at the receiving device (135), estimated reflection coefficients of the configurable surface (120) for an ideal channel (BS-RIS) between the transmitting device (110) and the configurable surface (120). Moreover, the method comprises estimating, according to a relation between the trained reflection coefficients and the estimated reflection coefficients, characteristics of a channel (BS-RIS) between the transmitting device (110) and the configurable surface (120).

According to a second aspect provided in addition to the first aspect, estimating the estimated reflection coefficients comprises a step of estimating, from the AoA at the receiving device (135), an angle of departure (AoD) of the signals at the configurable surface. Furthermore, according to the second aspect, estimating the estimated reflection coefficients is based on the estimated AoD at the configurable surface.

According to a third aspect provided in addition to the second aspect, the reflection coefficients are estimated according to following formulas $$\phi_{n,m}(\theta^R_{AoA}, \varphi^R_{AoA}, \theta^R_{AoD}, \varphi^R_{AoD}) = \gamma_{n,m} e^{j\alpha_{n,m}},$$

$$\alpha_{n,m} = \mod\left(\frac{-2\pi}{\lambda}\left[\left(m - \frac{1}{2}\right)\Gamma_x dx + \left(n - \frac{1}{2}\right)\Gamma_y dy\right], 2\pi\right),$$

$$\Gamma_x = \sin\theta^R_{AoA}\cos\varphi^R_{AoA} + \sin\theta^R_{AoD}\cos\varphi^R_{AoD}, \text{ and}$$

$$\Gamma_y = \sin\theta^R_{AoA}\sin\varphi^R_{AoA} + \sin\theta^R_{AoD}\sin\varphi^R_{AoD},$$

wherein
- $\phi_{n,m}$ is a reflection coefficient of the (n, m)-th element of the configurable surface,
- $\gamma_{n,m}$ is a reflection gain of the (n, m)-th element of the configurable surface, the $\gamma_{n,m}$ being predetermined,
- j is the imaginary unit,
- λ the wavelength of the signal,
- dx is a separation between elements of the configurable surface in an x-direction,
- dy is a separation between elements of the configurable surface in an y-direction,
- $\theta_{AoA}^R$ is a predetermined elevation AoA at the configurable surface,
- $\varphi_{AoA}^R$ is an predetermined azimuth AoA at the configurable surface,
- $\theta_{AoD}^R$ is an elevation AoD of the estimated AoD at the configurable surface, and
- $\varphi_{AoD}^R$ is an azimuth AoD of the estimated AoD at the configurable surface.

According to a fourth aspect provided in addition to the third aspect, the estimated characteristics of the non-ideal channel (BS-RIS) are a modified channel matrix $\hat{G}$ obtained in accordance with the relation $\hat{G}=(\Theta^{V'})^{-1}\Theta(\theta_{AoA}{}^R, \varphi_{AoA}{}^R, \theta_{AoD}{}^R, \varphi_{AoD}{}^R)G_{opt}(\theta_{AoA}{}^R, \varphi_{AoA}{}^R, \theta_{AoD}{}^B, \varphi_{AoD}{}^B)$, wherein:

$\Theta(\theta_{AoA}{}^R, \varphi_{AoA}{}^R, \theta_{AoD}{}^R, \varphi_{AoD}{}^R)$ is a diagonal matrix comprising the estimated reflection coefficients on its diagonal, $\Theta=\mathrm{diag}\{\mathrm{vec}(\phi_{n,m})\}$;

$G_{opt}(\theta_{AoA}{}^R, \varphi_{AoA}{}^R, \theta_{AoD}{}^R, \varphi_{AoD}{}^R)$ is a channel matrix of the ideal channel (BS-RIS) between the transmitting device (110) and the configurable surface (120), wherein $\theta_{AoD}{}^B$ and $\varphi_{AoD}{}^B$ are respectively the elevation and azimuth AoD at the base station for the ideal channel, and $\theta_{AoA}{}^R$ and $\varphi_{AoA}{}^R$ are respectively the elevation and azimuth AoAs at the configurable surface for the ideal channel;

$\Theta^{V'}$ is a diagonal matrix comprising the trained reflection coefficients on its diagonal; and $(\Theta^{V'})^{-1}$ is an inverse matrix of the diagonal matrix $\Theta^{V'}$.

According to a fifth aspect provided in addition to the fourth aspect, the modified channel matrix $\hat{G}$ corresponds to a matrix obtained from a channel matrix G of the channel between the transmitting device (110) and the configurable surface (120) by setting an absolute value of each element of the channel matrix G to one. Furthermore, according to the fifth aspect, the method comprises a step of determining, based on the modified channel matrix $\hat{G}$, a modified channel matrix $\hat{H}$.

According to a sixth aspect provided in addition to the fifth aspect, the modified channel matrix $\hat{H}$ is determined by an iterative reweighting algorithm.

According to a seventh aspect provided in addition to one of the first to sixth aspect, the trained reflection coefficients are configured by the transmitting device.

According to an eighth aspect provided in addition to one of the first to seventh aspect, the beamforming search comprises a hierarchic beamforming search comprising a first stage in which the beamforming search is performed in a plurality, V, of layers. In particular, for each current layer following the first layer of the plurality of layer i) a predefined number of beams is searched to find a best beam in the current layer, wherein beams of the predefined number of beams searched are selected based on a best beam of a layer immediately preceding the current layer; and ii) in the current layer a number of antennas contributing to the beamforming is increased compared to the layer immediately preceding the current layer.

According to a ninth aspect provided in addition to the eighth aspect, the hierarchic beamforming search further comprises a second stage in which a plurality of beams in a vicinity of the beam found after the first stage are searched.

According to a tenth aspect, a method for tracking a location of a receiving device is provided. The method comprising the method according to any of the first to ninth aspect, for estimating, at the receiving device (135), the characteristics of the channel (BS-UE) between the transmitting device (110) and the receiving device (135). Furthermore, the method according to the tenth aspect comprises, tracking, based on the characteristics of the channel (BS-UE) between the transmitting device (110) and the receiving device (135) and/or the modified channel matrix 11, the location of the communication device.

According to an eleventh aspect, the method according to the tenth aspect is provided for tracking the location of the receiving device using extended Kalman filtering or least mean square, LMS, based tracking.

According to a twelfth aspect, a computer program product is provided. The computer program product comprises a non-transitory computer-readable medium comprising code instructions which, when executed on one or more processors, cause the one or more processors to perform the method according to any of the first to the eleventh aspect.

According to a thirteenth aspect, an apparatus for estimating, at a receiving device (135), characteristics of a channel (BS-UE) is provided. The channel is between a transmitting device (110) and the receiving device (135) and comprises reflection on a configurable surface (120). The apparatus comprises processing circuitry. The processing circuitry is configured to control a transceiver of the receiving device (135) to perform beamforming search for transmission of signals over the channel (BS-UE), thereby obtaining i) trained reflection coefficients of the configurable surface (120), and ii) an angle of arrival, AoA, of the signals at the receiving device (135). Furthermore, the processing circuitry is configured to estimate, based on the configurable surface (120) and the obtained AoA at the receiving device (135), estimated reflection coefficients of the configurable surface (120) for an ideal channel (BS-RIS) between the transmitting device (110) and the configurable surface (120). Moreover, the processing circuitry is configured to estimate, according to a relation between the trained reflection coefficients and the estimated reflection coefficients, characteristics of a channel (BS-RIS) between the transmitting device (110) and the configurable surface (120).

According to a fourteenth aspect, a communication device is provided. The communication device comprises the apparatus for channel estimation according to the thirteenth aspect; and the transceiver.

According to a fifteenth aspect a method for setting, by a transmitting device (110), reflection coefficients of a configurable surface (120) is provided. The method comprises performing beamforming search for transmission of signals over a channel (BS-UE) between the transmitting device (110) and a receiving device (135), wherein the channel comprises reflection on the configurable surface (120). By performing the beamforming search, i) trained reflection coefficients of the configurable surface (120), and ii) an angle of arrival (AoA) of the signals at the receiving device (135) are obtained. Furthermore, the method comprises estimating an angle of departure (AoD) of the signals at the configurable surface from the AoA at the receiving device (135). Furthermore, the method comprises estimating, based on the configurable surface (120) and the obtained AoA at the receiving device (135), estimated reflection coefficients of the configurable surface (120) for an ideal channel (BS-RIS) between the transmitting device (110) and the configurable surface (120). Furthermore, the method comprises estimating, according to a relation between the trained reflection coefficients and the estimated reflection coefficients, characteristics of a channel (BS-RIS) between the transmitting device (110) and the configurable surface (120). Moreover, the method comprises setting the reflection coefficients of the configurable surface (120) according to $\Theta=\Theta(\theta_{AoA}{}^R, \varphi_{AoA}{}^R, \theta_{des}, \varphi_{des})G_{opt}\hat{G}^H(\hat{G}\hat{G}^H)^{-1}$, wherein $\Theta^{V'}$ is a diagonal matrix comprising the trained reflection coefficients on its diagonal, $\theta_{des}$ is a target elevation AoD at the configurable surface (120), $\varphi_{des}$ is a target azimuth AoD at the configurable surface (120), $\theta_{AoA}{}^R$ is a predetermined elevation AoA at the configurable surface, $\varphi_{AoA}{}^R$ is an predetermined azimuth AoA at the configurable surface, $\theta_{AoD}{}^R$ is an elevation AoD of the estimated AoD at the configurable surface; and $\varphi_{AoD}{}^R$ is an azimuth AoD of the estimated AoD at the configurable surface.

Moreover, the corresponding methods are provided comprising steps performed by any of the above mentioned processing circuitry implementations.

Still further, a computer program is provided, stored on a non-transitory medium, and comprising code instructions which when executed by a computer or by a processing circuitry, performs steps of any of the above mentioned methods.

According to an embodiment, the processing circuitry and/or the transceiver is embedded in an integrated circuit, IC.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

The invention claimed is:

1. A method for estimating, at a receiving device characteristics of a channel between a transmitting device and the receiving device comprising:
    performing beamforming search for transmission of signals over the channel, thereby obtaining:
        trained reflection coefficients of the configurable surface, and
        an angle of arrival (AoA) of the signals at the receiving device;
    estimating, based on the AoA at the receiving device, estimated reflection coefficients of the configurable surface for an ideal channel between the transmitting device and the configurable surface; and
    estimating, according to a relation between the trained reflection coefficients and the estimated reflection coefficients, characteristics of a second channel between the transmitting device, and the configurable surface.

2. The method according to claim 1, wherein estimating the estimated reflection coefficients:
    comprises estimating an estimated angle of departure (AoD) of the signals at the configurable surface from the AoA at the receiving device; and
    is based on the estimated AoD at the configurable surface.

3. The method according to claim 2, wherein
    the reflection coefficients are estimated according to following formulas $$\phi_{n,m}(\theta_{AoA}^R, \varphi_{AoA}^R, \theta_{AoD}^R, \varphi_{AoD}^R) = \gamma_{n,m} e^{j\alpha_{n,m}},$$

$$\alpha_{n,m} = \mathrm{mod}\left(\frac{-2\pi}{\lambda}\left[\left(m-\frac{1}{2}\right)\Gamma_x dx + \left(n-\frac{1}{2}\right)\Gamma_y dy\right], 2\pi\right),$$

$$\Gamma_x = \sin\theta_{AoA}^R \cos\varphi_{AoA}^R + \sin\theta_{AoD}^R \cos\varphi_{AoD}^R, \text{ and}$$

$$\Gamma_y = \sin\theta_{AoA}^R \sin\varphi_{AoA}^R + \sin\theta_{AoD}^R \sin\varphi_{AoD}^R,$$

wherein
$\Phi_{n,m}$ is a reflection coefficient of the (n, m)-th element of the configurable surface, $\gamma_{m,n}$ is a reflection gain of the (n, m)-th element of the configurable surface, the $\gamma_{m,n}$ being predetermined, j is the imaginary unit, $\lambda$ the wavelength of the signal, dx is a separation between elements of the configurable surface, in any x-direction, dy is a separation between elements of the configurable surface in any y-direction, $\theta_{AoA}{}^R$ is a predetermined elevation AoA at the configurable surface, $\varphi_{AoA}{}^R$ is a predetermined azimuth AoA at the configurable surface, $\theta_{AoD}{}^R$ is an elevation AoD of the estimated AoD at the configurable surface, and $\varphi_{AoD}{}^R$ is an azimuth AoD of the estimated AoD at the configurable surface.

4. The method according to claim 3, wherein the estimated characteristics of the second channel are a modified channel matrix Ĝ obtained in accordance with the relation $$\hat{G} = (\Theta^V)^{-1}\Theta(\theta_{AoA}^R, \varphi_{AoA}^R, \theta_{AoD}^R, \varphi_{AoD}^R) G_{opt}(\theta_{AoA}^R, \varphi_{AoA}^R, \theta_{AoD}^B, \varphi_{AoD}^B), \text{ wherein}$$

$\Theta(\theta_{AoA}{}^R, \varphi_{AoA}{}^R, \theta_{AoD}{}^R, \varphi_{AoD}{}^R)$ is a diagonal matrix comprising the estimated reflection coefficients on its diagonal, $\Theta = \mathrm{diag}\{\mathrm{vec}(\Phi_{n,m})\}$;

$G_{opt}(\theta_{AoA}{}^R, \varphi_{AoA}{}^R, \theta_{AoD}{}^B, \varphi_{AoD}{}^B)$ is a channel matrix of the ideal channel between the transmitting device and the configurable surface, wherein $\theta_{AoD}{}^B$ and $\varphi_{AoD}{}^B$ are respectively the elevation and azimuth AoD at the base station for the ideal channel, and $\theta_{AoA}{}^R$ and $\varphi_{AoA}{}^R$ are respectively the elevation and azimuth AoAs at the configurable surface for the ideal channel;

$\Theta^V$ is a diagonal matrix comprising the trained reflection coefficients on its diagonal; and $(\Theta^V)^{-1}$ is an inverse matrix of the diagonal matrix $\Theta^V$.

5. The method according to claim 4, wherein the modified channel matrix Ĝ corresponds to a matrix obtained from a channel matrix G of the second channel between the transmitting device and the configurable surface by setting an absolute value of each element of the channel matrix G to one, and
    the method further comprises determining, based on the modified channel matrix Ĝ, a modified channel matrix Ĥ.

6. The method according to claim 5, wherein the modified channel matrix Ĥ is determined by an iterative reweighting algorithm.

7. The method according claim 1, wherein
    the trained reflection coefficients are configured by the transmitting device.

8. The method according to claim 1, wherein the beamforming search comprises a hierarchic beamforming search comprising a first stage in which the beamforming search is performed in a plurality, V, of layers, wherein for each current layer following the first layer of the plurality of layers:
    a predefined number of beams is searched to find a best beam in the current layer, wherein beams of the predefined number of beams searched are selected based on a best beam of a layer immediately preceding the current layer; and
    in the current layer a number of antennas contributing to the beamforming is increased compared to the layer immediately preceding the current layer.

9. The method according to claim 8, wherein the hierarchic beamforming search further comprises a second stage in which a plurality of beams in a vicinity of the beam found after the first stage are searched.

10. The method according to claim 1, further comprising: tracking, based on the characteristics of the channel between the transmitting device and the receiving device and/or the modified channel matrix $\hat{H}$, the location of the communication device.

11. The method according to claim 10, wherein tracking comprises using at least one of extended Kalman filtering or least mean square (LMS) based tracking.

12. A computer program product comprising a non-transitory computer-readable medium comprising code instructions which, when executed on one or more processors, cause the one or more processors to perform the method according to claim 1.

13. An apparatus for estimating, at a receiving device characteristics of a channel between a transmitting device and the receiving device, the channel comprising reflection on a configurable surface the apparatus comprising:
processing circuitry configured to:
control a transceiver of the receiving device to perform beamforming search for transmission of signals over the channel, thereby obtaining:
trained reflection coefficients of the configurable surface, and
an angle of arrival (AoA) of the signals at the receiving device;
estimate, based on the (AoA) at the receiving device, estimated reflection coefficients of the configurable surface for an ideal channel between the transmitting device and the configurable surface; and
estimate, according to a relation between the trained reflection coefficients and the estimated reflection coefficients, characteristics of a second channel between the transmitting device and the configurable surface.

14. A communication device comprising:
the apparatus for channel estimation according to claim 13; and
the transceiver.

15. A method for setting, by a transmitting device, reflection coefficients of a configurable surface, the method comprising:
performing beamforming search for transmission of signals over a channel between the transmitting device and a receiving device, the channel comprising: reflection on the configurable surface, thereby obtaining:
trained reflection coefficients of the configurable surface, and
an angle of arrival (AoA) of the signals at the receiving device;
estimating an angle of departure (AoD) of the signals at the configurable surface from the AoA at the receiving device;
estimating, based on the AoA at the receiving device, estimated reflection coefficients of the configurable surface for an ideal channel between the transmitting device and the configurable surface;
estimating, according to a relation between the trained reflection coefficients and the estimated reflection coefficients, a modified channel matrix $\hat{G}$ of a second channel between the transmitting device and the configurable surface that accounts only for the phase change caused by the second channel; and
setting the reflection coefficients of the configurable surface according to $$\Theta = \Theta(\theta_{AoA}^R, \varphi_{AoA}^R, \theta_{des}, \varphi_{des}) G_{opt} \hat{G}^H (\hat{G}\hat{G}^H)^{-1}, \text{ wherein}$$

$G_{opt}(\theta_{AoA}^R, \varphi_{AoA}^R, \theta_{AoD}^B, \varphi_{AoD}^B)$ is a channel matrix of the ideal channel between the transmitting device and the configurable surface, $\theta_{AoD}^B$ and $\varphi_{AoD}^B$ are respectively an elevation and azimuth AoD at the base station for the ideal channel, $\Theta(\theta_{AoA}^R, \varphi_{AoA}^R, \theta_{des}, \varphi_{des})$ is a diagonal matrix comprising, on its diagonal, reflection coefficients corresponding to angles $\theta_{AoA}^R$, $\varphi_{AoA}^R$, $\theta_{des}$, and $\varphi_{des}$, $\theta_{des}$ is a target elevation AoD at the configurable surface, $\varphi_{des}$ is a target azimuth AoA at the configurable surface, $\theta_{AoA}^R$ is a predetermined elevation AoA at the configurable surface, and $\varphi_{AoA}^R$ is a predetermined azimuth AoA at the configurable surface.

* * * * *